US011916862B1

(12) United States Patent
Li et al.

(10) Patent No.: US 11,916,862 B1
(45) Date of Patent: Feb. 27, 2024

(54) MENTIONS PROCESSOR CONFIGURED TO PROCESS MENTION IDENTIFIERS

(71) Applicant: Salesforce, Inc., San Francisco, CA (US)

(72) Inventors: Jiang Li, San Francisco, CA (US); Ashwathi Krishnan, San Francisco, CA (US); Jacob Tyler Massey, Washington, DC (US); Mia Nelson, San Francisco, CA (US); Catherine Yesenia Alvarado, San Francisco, CA (US); Ryan Greenberg, Montclair, NJ (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/089,119

(22) Filed: Dec. 27, 2022

(51) Int. Cl.
  *H04L 51/224* (2022.01)
  *H04L 51/212* (2022.01)

(52) U.S. Cl.
  CPC .......... *H04L 51/224* (2022.05); *H04L 51/212* (2022.05)

(58) Field of Classification Search
  CPC ........................... H04L 51/224; H04L 51/212
  See application file for complete search history.

(56) References Cited

U.S. PATENT DOCUMENTS

2015/0081569 A1* 3/2015 Moore .................... H04W 4/21
  709/204
2016/0373383 A1* 12/2016 Pinkovezky .......... H04L 67/535
2016/0380952 A1* 12/2016 Vora ....................... H04L 51/52
  709/206
2017/0046719 A1* 2/2017 Kulchytskyy .......... G06Q 50/01
2017/0257654 A1* 9/2017 Branch ............. H04N 21/8456
2018/0287982 A1 10/2018 Draeger et al.

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Austin J Moreau
(74) *Attorney, Agent, or Firm* — Lee & Hayes, P.C.

(57) ABSTRACT

Techniques for identifying mention identifiers within a message using a mentions processor are discussed herein. In some examples, a communication platform maintains a mentions processor configured to receive a message including a mention identifier, analyze the message to determine a type of the mention identifier included in the message, identify a second user account or a virtual space referenced by the mention identifier, determine whether a notification should be sent to the second user account or the virtual space, and, upon determining that the notification should be sent, send the notification associated with the message to the second user profile or the virtual space. In some examples, an observability class associated with the mentions processor allows the use of a mentions lookup tool to view one or more stored mention identifiers associated with the message and one or more stored notifications enqueued for the message.

20 Claims, 11 Drawing Sheets

(56) References Cited

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

FIG. 3A

User A
- Threads
- All DMs
- Mentions & reactions
- Saved items
- Connect
- More
- ▶ Connections
- ▼ Channels
  - #general
  - #social
  - #Channel_A
  - #Channel_B
- ▶ Documents
- ▼ Direct messages
  - User_B
  - User_C
  - User_B, User_C...
- ▶ Apps Mentions Lookup

Mentions Lookup — 602

These are the effects of running mentions_log for:
https://acme-pde.acme.com/archives/A123BCDEF/p123456789...

Stored Mentions — 610

These are the mentions that were detected from the message and will be stored in the mentions tables.
Displayed mentions include single, bulk, and multi mentions.

| Type — 612 | User ID — 614 | Grouping ID — 616 |
|---|---|---|
| USER_ACCOUNT | 1002003004401900 | |
| USER_ACCOUNT | 1002003004401555 | |
| USER_ACCOUNT | 1002003004401506 | |
| USER_GROUP | | 1002003004401879 |
| WORD | | |
| WORD | 1002003004051684 | |
| CHANNEL | | 1002003004557789 |

Notifications — 618

These are the notifications that would be enqueued for this message.

| Type | Team ID | User ID | Channel ID | Timestamp | DND Override |
|---|---|---|---|---|---|
| USER_ACCOUNT | 100200333 | 10090444 | 100650555 | 1003121245 | False |
| USER_GROUP | 100200333 | 10090444 | 100650555 | 1003121245 | False |
| WORD | 100200333 | 10090444 | 100650555 | 1003121245 | False |

FIG. 6B

MENTIONS PROCESSOR CONFIGURED TO PROCESS MENTION IDENTIFIERS

TECHNICAL FIELD

Various messaging systems may support communication and collaboration among users across an electronic computer-based communication platform. Messages sent via the communication platform are evaluated to determine which users and/or channels are to be notified of the message. However, a number of deficiencies and problems are associated with the current processing logic used to determine which users and/or channels are to be notified. For example, current processing logic may be difficult for users to navigate, error prone, and/or may not provide users with information necessary to determine how a messaging error occurred. Such current systems are thus limited in scope and functionality.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 3A depicts a user interface for workflows within a group-based communication system.

FIG. 6B illustrates a user interface that enables a user to view stored mention identifiers associated with a message.

DETAILED DESCRIPTION

Figure 1:
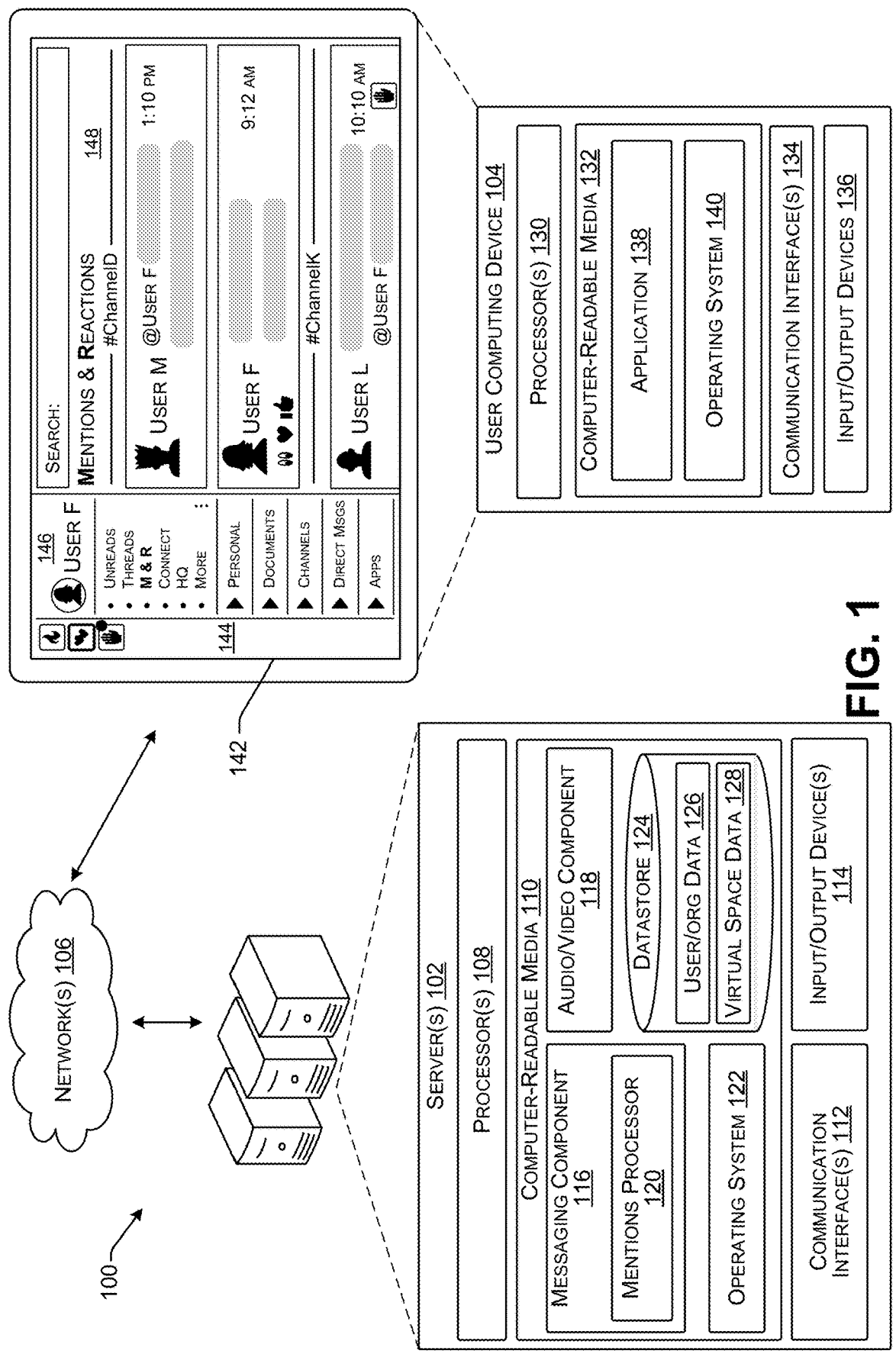
FIG. 1 illustrates an example system for performing techniques described herein.

Messages including mention identifiers (e.g., @name, @channel, @directmessage, etc.) sent across a communication platform may be processed through mentions processing logic in order to determine which user, or group of users in a virtual space, should be notified of a message. As mentioned above, existing techniques for processing mention identifiers within a message include processing logic that may be difficult for users to navigate, error prone, and may not provide users with information necessary to determine how a notification error occurred. Processing logic in existing systems may not allow for validation of the business logic of the code without reprocessing a message and triggering all side effects.

Technical solutions presented herein may address one or more of the above-mentioned technical problems. According to aspects of the disclosure, a mentions processor may encapsulate all configurations and side effects in a mentions processor. Side effects may include the effects that are observed from outside the functions that are processed within the mentions processor. In other words, a function, operation, or expression is said to have a side effect when the function, operation, and/or expression changes a non-local state, when its output is not deterministic, or when it modifies some state variable outside the local environment in which it is executing. Functions related to mention identifiers within messages are run through an instance of a mentions processor container. A container is a class or a data structure that is configured to store other data items or objects. A container may also be described as a package of software that contains all of the necessary elements to run in any environment (e.g., in a private data center, a public cloud, a developer's computing device, etc.). In some cases, the mentions processor allows different applications of the side effects without having to reimplement the overall business logic each time.

The techniques described herein are also directed to a record only mentions processor that enables all side effects to be recorded and displayed, rather than being applied, which allows for introspection of business logic without additional processing. The record only mentions processor may be associated with an observability class of the mentions processor. For instance, the record only mentions processor provides information about what mention identifiers were detected in a message without triggering any notifications to be sent to users and/or virtual spaces. Rather than sending one or more notifications, the record only mentions processor stores the information in one or more databases. The stored information may include detected mention identifiers within a message, jobs that were processed, what subscription occurred for past messages, if any, without having to resend the message. As such, the record only mentions processor improves visibility, organization of information, and reduces computational burden. The record only mentions processor is associated with a mentions lookup tool that enables users to review the stored information including what mentions were detected in a message, if any, as well as what notifications would be sent, if any, for the message based on the mentions within that message.

The mentions processor is configured to parse messages and identify mention identifiers within messages sent across the communication platform. Mention identifiers are used to tag other user accounts or virtual spaces (e.g., channels, a feed, etc.) in order to direct attention to some information (e.g., a message, document, keyword, project, etc.) shared within the communication platform. Mention identifiers may be of various types and may include, for example, a keyword mention identifier, a user account mention identifier, a group mention identifier, a channel mention identifier, a virtual space mention identifier, or a document mention identifier. The mentions processor may identify, based at least in part on the type of mention identifier within the message, a second user profile and/or visual space of the communication platform referenced by the mention identifier. The mentions processor may determine whether a notification should be sent to a particular user account and/or virtual space and, based on determining that a notification should be sent, send notification(s) based on preference settings associated with user accounts and/or virtual spaces. Notifications may include an email, a text message, a pop-up notification, a channel notification, a delayed notification, and the like.

The mentions processor may generate log data associated with mention identifiers and store the log data in one or more databases. Log data may represent a historical record of information and/or data processed by the mentions processors (e.g., metadata associated with each message transmitted via the virtual space, such as a timestamp associated with the message, a sending user identifier, a recipient user identifier, a conversation identifier and/or a root object identifier, error(s) during processing, etc.). A search tool (i.e., a mentions lookup tool) may be used to view stored mention identifiers associated with a message. For example, a user may input data associated with a message into the search tool. Data associated with the message may include, for example, a permalink, a message identification code, a team identification code, a channel identification code, or a timestamp. The search tool may be used to view one or more observed mention identifiers within a message without triggering all side effects (e.g., a user may utilize the search tool without triggering the side effect of sending a notification to another user of the communication platform). The search tool may also be used to view which notifications were sent to users and/or virtual spaces, if any.

The techniques described herein may reduce the amount of computational processing performed by computing devices when processing mention identifiers within messages and sending notifications across a communication platform. The mentions processor enables all side effects to run through an instance of the mentions processor and decreases the number of computations in existing systems. Techniques described herein enable different applications of the side effects without having to reimplement the logic of the code in each use case. The techniques described herein also enable, in some instances, the side effects to be recorded and displayed via a user interface instead of applied, allowing for introspection of the business logic without processing the side effects. Moreover, the techniques discussed herein may reduce the number of errors that occur when a mention identifier is processed within a message as well as adding the benefit of visibility of errors. Errors resulting from processing mention identifiers would require reprocessing of the mention identifiers and corresponding messages, which would cause additional computational processing requirements.

The techniques described herein offer various benefits to users associated with the communication platform. For example, users have access to a tool (e.g., a mentions lookup tool) that enables users to view what mention identifiers were detected in a message, as well as what notifications may have been sent in association with the message. The tool may provide users insight into how a notification error occurred (e.g., a notification error may occur when a notification is sent to an incorrect user, an incorrect virtual space, at an incorrect time or day, an incorrect type of notification, etc.) and, as a result, helps users prevent future notification errors from occurring. As such, systems structured in accordance with various examples of the disclosure provide specific, technical solutions to technical problems, the details of which are described herein.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and/or input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116 including a mentions processor 120, an audio/video component 118, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104. In various examples, the messaging component 116 can identify the message as an update to the virtual space and, based on the identified update, can cause a notification associated with the update to be presented in association with a sidebar of a user interface associated with one or more of the user(s) associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the mentions processor 120 of the messaging component 116 can cause a notification of an update to the virtual space to be presented via a sidebar of a user interface associated with a second user account of the second user. In some examples, the mentions processor 120 of the messaging component 116 can cause the notification to be presented in response to a determination that the sidebar of the user interface associated with the second user account includes an affordance associated with the virtual space. In such examples, the notification can be presented in association with the affordance associated with the virtual space.

The messaging component 116 can include a mentions processor 120. In some examples, the messaging component 116 may include a plurality of mentions processors. For example, the messaging component may include a first mentions processor configured to trigger side effects and a second mentions processor (e.g., a record only mentions processor) configured for use during debugging or for testing purposes. In some examples, a different mentions processor may be used for individual specific user(s) and/or virtual space(s). In some examples, the mentions processor 120 may encapsulate all configurations and side effects which occur during mentions processing. In some examples, the mentions processor 120 may be configured to identify and process all mention identifiers associated with a message transmitted in association with the communication platform. In some examples, the mentions processor 120 handles metadata (e.g., information about the mention identifier in a message, type of mention identifier, user identification, grouping identification, team identification, channel identification, timestamp, etc.) associated with the communication platform. The mentions processor 120 may include a container configured to capture side effects (e.g., notifications) within the mentions processor 120.

In some examples, the mentions processor 120 can be configured to identify a mention (or mention identifier) associated with a message transmitted in association with the virtual space. In at least one example, the mention identifier (or tag) can include an @mention (or other special character) of a user identifier that is associated with the communication platform. In some examples, the mentions processor 120 may be configured to identify one or more mention identifiers (e.g., an @mention) embedded within a message. The mentions processor 120 can be configured to determine a type of mention identifier embedded within a message. For example, the mentions processor 120 may be configured to identify a keyword mention identifier (e.g., @new_project, @new_promotional_materials, @holiday_party_2022, etc.), a user profile mention identifier (e.g., @User_A), a group mention identifier (@Group 1), a channel mention identifier (e.g., @Channel_A), a document mention identifier (e.g., @Document_1), or an application mention identifier (e.g., @application_A) within a message or other communication transmitted in association with the virtual space. In some examples, the user profile mention identifier can include a username, real name, or other unique identifier that is associated with a particular user or user account.

In response to analyzing the message to determine a type of mention identifier included in the message, the mentions processor 120 can identify a user account and/or a virtual space of the communication platform referenced by the mention identifier. In response to identifying a user account and/or a virtual space, the mentions processor 120 of the messaging component 116 may determine whether a notification should be sent to the user account and/or virtual space. For example, the mentions processor 120 may determine that a notification should be sent to a user account and/or a virtual space based at least in part on a notification preference setting associated with the user account or the virtual space. Additional details of operations that can be performed by the mentions processor 120 are described below.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In some examples, the communication platform can manage communication channels. In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In some examples, a channel can be a virtual space where people can post messages, documents, and/or files. In some examples, access to channels can be controlled by permissions. In some examples, channels can be limited to a single organization, shared between different organizations, public, private, or special channels (e.g., hosted channels with guest accounts where guests can make posts but are prevented from performing certain actions, such as inviting other users to the channel). In some examples, some users can be invited to channels via email, channel invites, direct messages, text messages, and the like. Examples of channels and associated functionality are discussed throughout this disclosure.

In at least one example, the operating system 122 can manage the processor(s) 108, computer-readable media 110, hardware, software, etc. of the server(s) 102.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

In some examples, such as when a channel is shared between two organizations, each organization can be associated with its own encryption key. When a user associated with one organization posts a message or file to the shared channel it can be encrypted in the datastore 124 with the encryption key specific to the organization and the other organization can decrypt the message or file prior to accessing the message or file. Further, in examples where organizations are in different geographical areas, data associated with a particular organization can be stored in a location corresponding to the organization and temporarily cached at a location closer to a client (e.g., associated with the other organization) when such messages or files are to be accessed. Data can be maintained, stored, and/or deleted in the datastore 124 in accordance with a data governance policy associated with each specific organization.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web Sockets, Application Programming Interfaces (APIs) (e.g., using API calls), Hypertext Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with. In some examples, the third region 148 may be resized or popped out as a standalone window.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Web Sockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the mentions processor 120, and the application 138, techniques described herein can be performed by any other component, or combination of components, which can be associated with the server(s) 102, the user computing device 104, or a combination thereof.

User Interface for a Group-Based Communication System

Figure 2A:
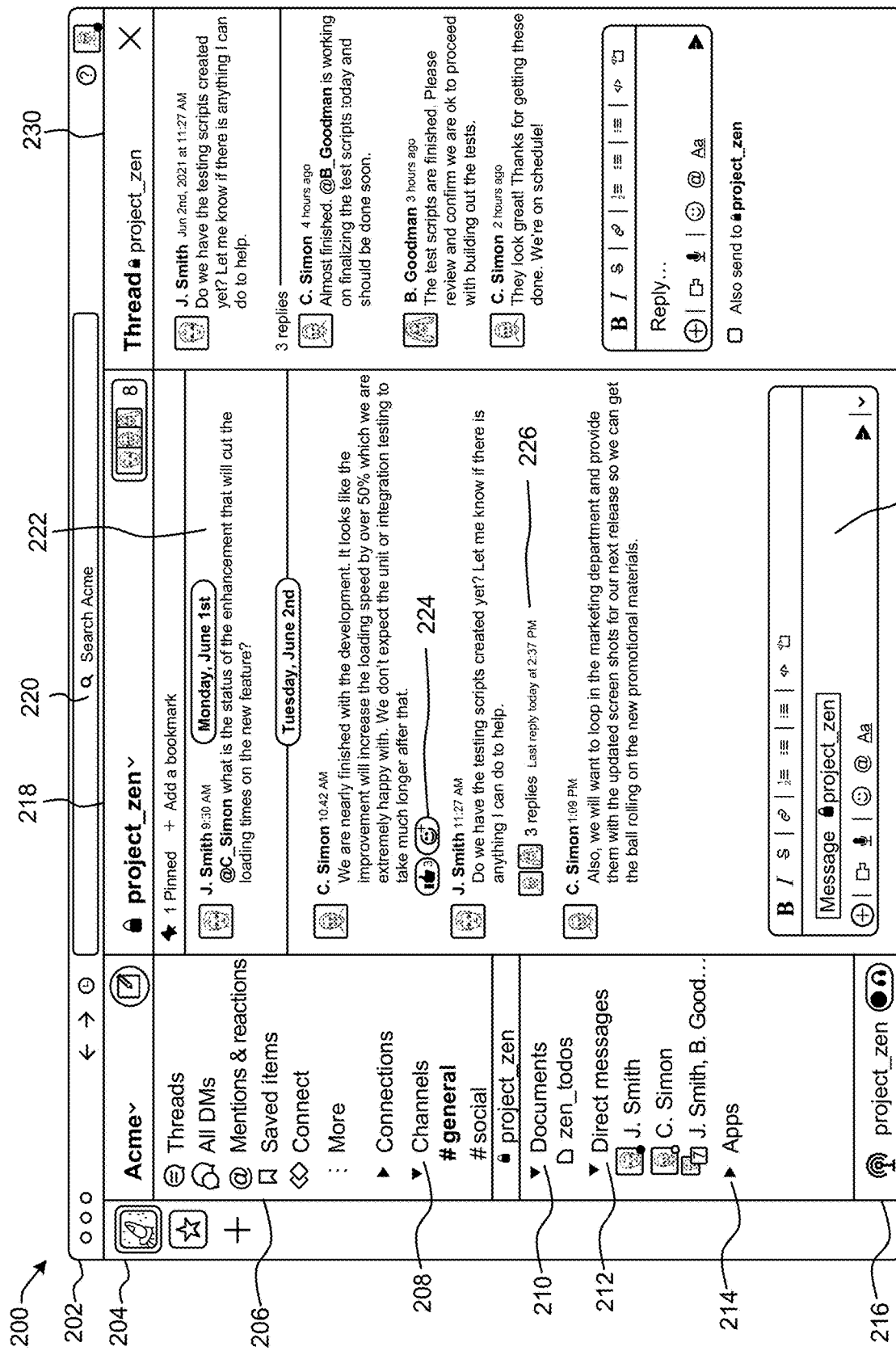
FIG. 2A illustrates a user interface for a group-based communication system for certain examples.

FIG. 2A illustrates a user interface 200 of a group-based communication system, which will be useful in illustrating the operation of various examples discussed herein. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

The user interface 200 comprises a plurality of objects such as panes, text entry fields, buttons, messages, or other user interface components that are viewable by a user of the group-based communication system. As depicted, the user interface 200 comprises a title bar 202, a workspace pane 204, a navigation pane 206, channels 208, documents 210 (e.g., collaborative documents), direct messages 212, applications 214, a synchronous multimedia collaboration session pane 216, and channel pane 218.

By way of example and without limitation, when a user opens the user interface 200 they can select a workspace via the workspace pane 204. A particular workspace may be associated with data specific to the workspace and accessible via permissions associated with the workspace. Different sections of the navigation pane 206 can present different data and/or options to a user. Different graphical indicators may be associated with virtual spaces (e.g., channels) to summarize an attribute of the channel (e.g., whether the channel is public, private, shared between organizations, locked, etc.). When a user selects a channel, a channel pane 218 may be presented. In some examples, the channel pane 218 can include a header, pinned items (e.g., documents or other virtual spaces), an "about" document providing an overview of the channel, and the like. In some cases, members of a channel can search within the channel, access content associated with the channel, add other members, post content, and the like. In some examples, depending on the permissions associated with a channel, users who are not members of the channel may have limited ability to interact with (or even view or otherwise access) a channel. As users navigate within a channel they can view messages 222 and may react to messages (e.g., a reaction 224), reply in a thread, start threads, and the like. Further, a channel pane 218 can include a compose pane 228 to compose message(s) and/or other data to associate with a channel. In some examples, the user interface 200 can include a threads pane 230 that provides additional levels of detail of the messages 222. In some examples, different panes can be resized, panes can be popped out to independent windows, and/or independent windows can be merged to multiple panes of the user interface 200. In some examples, users may communicate with other users via a collaboration pane 216, which may provide synchronous or asynchronous voice and/or video capabilities for communication. Of course, these are illustrative examples and additional examples of the aforementioned features are provided throughout this disclosure.

In some examples, title bar 202 comprises search bar 220. The search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some examples, the title bar 202 comprises navigation commands allowing a user to move backwards and forwards between different panes, as well as to view a history of accessed content. In some examples, the title bar 202 may comprise additional resources such as links to help documents and user configuration settings.

In some examples, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some examples, the user interface 200 comprises the workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use the workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some examples, an organization, such as a particular company, may have a plurality of workspaces, and the user may be associated with one or more workspaces belonging to the organization. In yet other examples, a particular workspace can be associated with one or more organizations or other entities associated with the group-based communication system.

In some examples, the navigation pane 206 permits users to navigate between virtual spaces such as pages, channels 208, collaborative documents 210 (such as those discussed at FIG. 2D), applications 214, and direct messages 212 within the group-based communication system. For example, the navigation pane 206 can include indicators representing virtual spaces that can aggregate data associated with a plurality of virtual spaces of which the user is a member. In at least one example, each virtual space can be associated with an indicator in the navigation pane 206. In some examples, an indicator can be associated with an actuation mechanism (e.g., an affordance, also referred to as a graphical element) such that when actuated, can cause the user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via the user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally or in the alternative, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

The navigation pane 206 may further comprise indicators representing communication channels (e.g., the channels 208). In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the navigation pane 206 may depict some or all of the communication channels that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the navigation pane 206 can depict some or all of the communication channels that the user is a member of, and the user can interact with the user interface 200 to browse or view other communication channels that the user is not a member of but are not currently displayed in the navigation pane 206. In some examples, different types of communication channels (e.g., public, private, shared, cross-workspace, etc.) can be in different sections of the navigation pane 206, or can have their own sub-regions or sub-panes in the user interface 200. In some examples, communication channels associated with different workspaces can be in different sections of the navigation pane 206, or can have their own regions or panes in the user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, the navigation pane 206 can include indicators representative of communications with individual users or multiple specified users (e.g., instead of all, or a subset of, members of an organization). Such communications can be referred to as "direct messages." The navigation pane 206 can include indicators representative of virtual spaces that are associated with private messages between one or more users.

The direct messages 212 may be communications between a first user and a second user, or they may be multi-person direct messages between a first user and two or more second users. The navigation pane 206 may be sorted and organized into hierarchies or sections depending on the user's preferences. In some examples, all of the channels to which a user has been granted access may appear in the navigation pane 206. In other examples, the user may choose to hide certain channels or collapse sections containing certain channels. Items in the navigation pane 206 may indicate when a new message or update has been received or is currently unread, such as by bolding the text associated with a channel in which an unread message is located or adding an icon or badge (for example, with a count of unread messages) to the channel name. In some examples, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally or in the alternative, the navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels within the Group-Based Communication System

In some examples, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some examples, the channel pane 218 may display information related to a channel that a user has selected in the navigation pane 206. For example, a user may select the project_zen channel to discuss the ongoing software development efforts for Project Zen. In some examples, the channel pane 218 may include a header comprising information about the channel, such as the channel name, the list of users in the channel, and other channel controls. Users may be able to pin items to the header for later access and add bookmarks to the header. In some examples, links to collaborative documents may be included in the header. In further examples, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via the channel pane 218 of the user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

The channel pane 218 may include messages such as message 222, which is content posted by a user into the channel. Users may post text, images, videos, audio, or any other file as the message 222. In some examples, particular identifiers (in messages or otherwise) may be denoted by prefixing them with predetermined characters. For example, channels may be prefixed by the "#" character (as in #project_zen) and username may be prefixed by the "@" character (as in @J_Smith or @User_A). Messages such as the message 222 may include an indication of which user posted the message and the time at which the message was posted. In some examples, users may react to messages by selecting a reaction button 224. The reaction button 224 allows users to select an icon (sometimes called a reacji in this context), such as a thumbs up, to be associated with the message. Users may respond to messages, such as the message 222, of another user with a new message. In some examples, such conversations in channels may further be broken out into threads. Threads may be used to aggregate messages related to a particular conversation together to make the conversation easier to follow and reply to, without cluttering the main channel with the discussion. Under the message beginning the thread appears a thread reply preview 226. The thread reply preview 226 may show information related to the thread, such as, for example, the number of replies and the members who have replied. Thread replies may appear in a thread pane 230 that may be separate from the channel pane 218 and may be viewed by other members of the channel by selecting the thread reply preview 226 in the channel pane 218.

In some examples, one or both of the channel pane 218 and the thread pane 230 may include a compose pane 228. In some examples, the compose pane 228 allows users to compose and transmit messages 222 to the members of the channel or to those members of the channel who are following the thread (when the message is sent in a thread). The compose pane 228 may have text editing functions such as bold, strikethrough, and italicize, and/or may allow users to format their messages or attach files such as collaborative documents, images, videos, or any other files to share with other members of the channel. In some examples, the compose pane 228 may enable additional formatting options such as numbered or bulleted lists via either the user interface or an API. The compose pane 228 may also function as a workflow trigger to initiate workflows related to a channel or message. In further examples, links or documents sent via the compose pane 228 may include unfurl instructions related to how the content should be displayed.

Synchronous Multimedia Collaboration Sessions

Figure 2B:
FIG. 2B illustrates a user interface for multimedia collaboration sessions within the group-based communication system for certain examples.

FIG. 2B illustrates a multimedia collaboration session (e.g., a synchronous multimedia collaboration session) that has been triggered from a channel, as shown in pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some examples, synchronous multimedia collaboration sessions may be based around a particular topic, a particular channel, a particular direct message or multi-person direct message, or a set of users, while in other examples, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some examples, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without requiring scheduling or initiating a communication session through a third-party interface. In some examples, users may be directly invited to attend a synchronous multimedia collaboration session via a message or notification.

Synchronous multimedia collaboration sessions may be short, ephemeral sessions from which no data is persisted. Alternatively, in some examples, synchronous multimedia collaboration sessions may be recorded, transcribed, and/or summarized for later review. In other examples, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some examples, members of the synchronous multimedia collaboration session may mark-up, comment on, draw on, or otherwise annotate a shared screen. In further examples, such annotations may be saved and persisted after the synchronous multimedia collaboration session has ended. A canvas may be created directly from a synchronous multimedia collaboration session to further enhance the collaboration between users.

In some examples, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 232. In some examples, users in the synchronous multimedia collaboration session may be displayed with an icon indicating that they are participating in the synchronous multimedia collaboration session. In further examples, an expanded view of the participants may show which users are active in the synchronous multimedia collaboration session and which are not. Screen share preview 232 may depict the desktop view of a user sharing the user's screen, or a particular application or presentation. Changes to the user's screen, such as the user advancing to the next slide in a presentation, will automatically be depicted in screen share preview 232. In some examples, the screen share preview 232 may be actuated to cause the screen share preview 232 to be enlarged such that it is displayed as its own pane within the group-based communication system. In some examples, the screen share preview 232 can be actuated to cause the screen share preview 232 to pop out into a new window or application separate and distinct from the group-based communication system. In some examples, the synchronous multimedia collaboration session pane 216 may comprise tools for the synchronous multimedia collaboration session allowing a user to mute the user's microphone or invite other users. In some examples, the synchronous multimedia collaboration session pane 216 may comprise a screen share button 234 that may permit a user to share the user's screen with other members of the synchronous multimedia collaboration session pane 216. In some examples, the screen share button 234 may provide a user with additional controls during a screen share. For example, a user sharing the user's screen may be provided with additional screen share controls to specify which screen to share, to annotate the shared screen, or to save the shared screen.

In some cases, the synchronous multimedia collaboration session pane 216 may persist in the navigation pane 206 regardless of the state of the group-based communication system. In some examples, when no synchronous multimedia collaboration session is active and/or depending on which item is selected from the navigation pane 206, the synchronous multimedia collaboration session pane 216 may be hidden or removed from being presented via the user interface 200. In some instances, when the pane 216 is active, the pane 216 can be associated with a currently selected channel, direct message, or multi-person direct message such that a synchronous multimedia collaboration session may be initiated and associated with the currently selected channel, direct message, or multi-person direct message.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some examples, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some examples, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some examples, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some examples, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some examples, one or more recommended asynchronous multimedia collaboration sessions or meetings can be displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some examples, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some examples, a preview of a subset of video replies may be shown in the asynchronous collaboration session or thread. This can allow, for example, a user to jump to a relevant segment of the asynchronous multimedia collaboration session or to pick up where they left off previously.

Connecting within the Group-Based Communication System

Figure 2C:
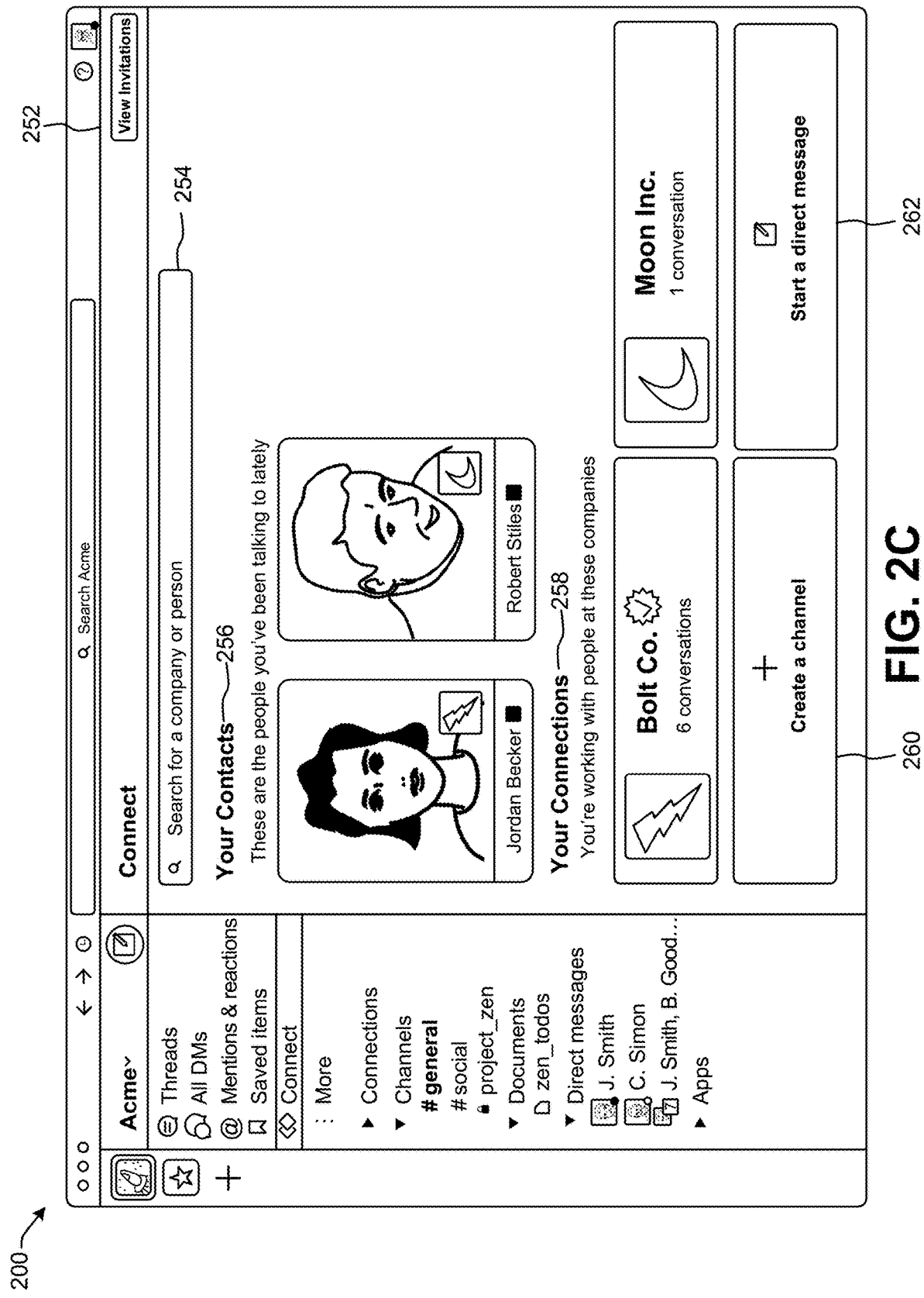
FIG. 2C illustrates a user interface for inter-organization collaboration within the group-based communication system for certain examples.

FIG. 2C illustrates user interface 200 displaying a connect pane 252. The connect pane 252 may provide tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. The connect pane 252 may enable users to determine which other users and organizations are already within the group-based communication system, and to invite those users and organizations currently outside of the group-based communication system to join.

The connect pane 252 may comprise a connect search bar 254, recent contacts 256, connections 258, a create channel button 260, and/or a start direct message button 262. In some examples, the connect search bar 254 may permit a user to search for users within the group-based communication system. In some examples, only users from organizations that have connected with the user's organization will be shown in the search results. In other examples, users from any organization that uses the group-based communication system can be displayed. In still other examples, users from organizations that do not yet use the group-based communication can also be displayed, allowing the searching user to invite them to join the group-based communication system. In some examples, users can be searched for via their group-based communication system username or their email address. In some examples, email addresses may be suggested or autocompleted based on external sources of data such as email directories or the searching user's contact list.

In some examples, external organizations as well as individual users may be shown in response to a user search. External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some examples, the recent contacts 256 may display users with whom the instant user has recently interacted. The recent contacts 256 may display the user's name, company, and/or a status indication. The recent contacts 256 may be ordered based on which contacts the instant user most frequently interacts with or based on the contacts with whom the instant user most recently interacted. In some examples each recent contact of the recent contacts 256 may be an actuatable control allowing the instant user to quickly start a direct message conversation with the recent contact, invite them to a channel, or take any other appropriate user action for that recent contact.

In some examples, the connections 258 may display a list of companies (e.g., organizations) with which the user has interacted. For each company, the name of the company may be displayed along with the company's logo and an indication of how many interactions the user has had with the company, for example the number of conversations. In some examples, each connection of the connections 258 may be an actuatable control allowing the instant user to quickly invite the external organization to a shared channel, display recent connections with that external organization, or take any other appropriate organization action for that connection.

In some examples, the create channel button 260 allows a user to create a new shared channel between two different organizations. Selecting the create channel button 260 may further allow a user to name the new connect channel and enter a description for the connect channel. In some examples, the user may select one or more external organizations or one or more external users to add to the shared channel. In other examples, the user may add external organizations or external users to the shared channel after the shared channel is created. In some examples, the user may elect whether to make the connect channel private (e.g., accessible only by invitation from a current member of the private channel).

In some examples, the start direct message button 262 allows a user to quickly start a direct message (or multi-person direct message) with external users at an external organization. In some examples, the external user identifier at an external organization may be supplied by the instant user as the external user's group-based communication system username or as the external user's email address. In some examples, an analysis of the email domain of the external user's email address may affect the message between the user and the external user. For example, the external user's identifier may indicate (for example, based on an email address domain) that the user's organization and the external user's organization are already connected. In some such examples, the email address may be converted to a group-based communication system username. Alternatively, the external user's identifier may indicate that the external user's organization belongs to the group-based communication system but is not connected to the instant user's organization. In some such examples, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
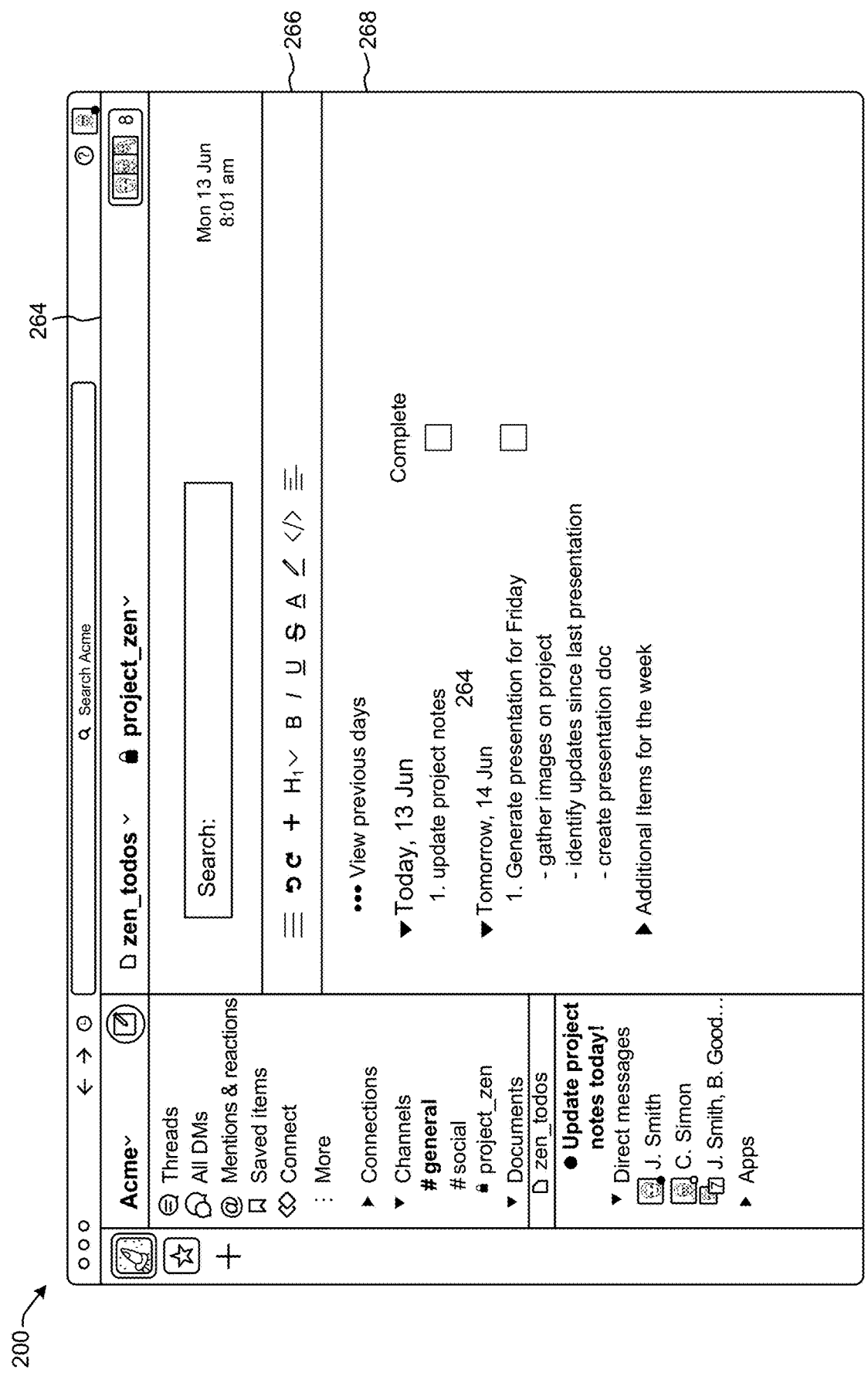
FIG. 2D illustrates a user interface for collaborative documents within the group-based communication system for certain examples.

FIG. 2D illustrates user interface 200 displaying a collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. In some examples, permissions can be determined and/or assigned automatically based on how document(s) are created and/or shared. In some examples, permission can be determined manually. Collaborative documents may allow users to simultaneously or asynchronously create and modify documents. Collaborative documents may integrate with the group-based communication system and can both initiate workflows and be used to store the results of workflows, which are discussed further below with respect to FIGS. 3A and 3B.

In some examples, the user interface 200 can comprise one or more collaborative documents (or one or more links to such collaborative documents). A collaborative document (also referred to as a document or canvas) can include a flexible workspace for curating, organizing, and sharing collections of information between users. Such documents may be associated with a synchronous multimedia collaboration session, an asynchronous multimedia collaboration session, a channel, a multi-person direct message conversation, and/or a direct message conversation. Shared canvases can be configured to be accessed and/or modified by two or more users with appropriate permissions. Alternatively or in addition, a user might have one or more private documents that are not associated with any other users.

Further, such documents can be @mentioned, such that particular documents can be referred to within channels (or other virtual spaces or documents) and/or other users can be @mentioned within such a document. For example, @mentioning a user within a document can provide an indication to that user and/or can provide access to the document to the user. In some examples, tasks can be assigned to a user via an @mention and such task(s) can be populated in the pane or sidebar associated with that user.

In some examples, a channel and a collaborative document 268 can be associated such that when a comment is posted in a channel it can be populated to a document 268, and vice versa.

In some examples, when a first user interacts with a collaborative document, the communication platform can identify a second user account associated with the collaborative document and present an affordance (e.g., a graphical element) in a sidebar (e.g., the navigation pane 206) indicative of the interaction. Further, the second user can select the affordance and/or a notification associated with or representing the interaction to access the collaborative document, to efficiently access the document and view the update thereto.

In some examples, as one or more users interact with a collaborative document, an indication (e.g., an icon or other user interface element) can be presented via user interfaces with the collaborative document to represent such interactions. For examples, if a first instance of the document is presently open on a first user computing device of a first user, and a second instance of the document is presently open on a second user computing device of a second user, one or more presence indicators can be presented on the respective user interfaces to illustrate various interactions with the document and by which user. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.).

In some examples, a preview of a collaborative document can be provided. In some examples, a preview can comprise a summary of the collaborative document and/or a dynamic preview that displays a variety of content (e.g., as changing text, images, etc.) to allow a user to quickly understand the context of a document. In some examples, a preview can be based on user profile data associated with the user viewing the preview (e.g., permissions associated with the user, content viewed, edited, created, etc. by the user), and the like.

In some examples, a collaborative document can be created independent of or in connection with a virtual space and/or a channel. A collaborative document can be posted in a channel and edited or interacted with as discussed herein, with various affordances or notifications indicating presence of users associated with documents and/or various interactions.

In some examples, a machine learning model can be used to determine a summary of contents of a channel and can create a collaborative document comprising the summary for posting in the channel. In some examples, the communication platform may identify the users within the virtual space, actions associated with the users, and other contributions to the conversation to generate the summary document. As such, the communication platform can enable users to create a document (e.g., a collaborative document) for summarizing content and events that transpired within the virtual space.

In some examples, documents can be configured to enable sharing of content including (but not limited to) text, images, videos, GIFs, drawings (e.g., user-generated drawings via a drawing interface), or gaming content. In some examples, users accessing a canvas can add new content or delete (or modify) content previously added. In some examples, appropriate permissions may be required for a user to add content or to delete or modify content added by a different user. Thus, for example, some users may only be able to access some or all of a document in view-only mode, while other users may be able to access some or all of the document in an edit mode allowing those users to add or modify its contents. In some examples, a document can be shared via a message in a channel, multi-person direct message, or direct message, such that data associated with the document is accessible to and/or rendered interactable for members of the channel or recipients of the multi-person direct message or direct message.

In some examples, the collaboration document pane 264 may comprise collaborative document toolbar 266 and collaborative document 268. In some examples, collaborative document toolbar 266 may provide the ability to edit or format posts, as discussed herein.

In some examples, collaborative documents may comprise free-form unstructured sections and workflow-related structured sections. In some examples, unstructured sections may include areas of the document in which a user can freely modify the collaborative document without any constraints. For example, a user may be able to freely type text to explain the purpose of the document. In some examples, a user may add a workflow or a structured workflow section by typing the name of (or otherwise mentioning) the workflow. In further examples, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some examples, structured sections may include text entry, selection menus, tables, checkboxes, tasks, calendar events, or any other document section. In further examples, structured sections may include text entry spaces that are a part of a workflow. For example, a user may enter text into a text entry space detailing a reason for approval, and then select a submit button that will advance the workflow to the next step of the workflow. In some examples, the user may be able to add, edit, or remove structured sections of the document that make up the workflow components.

In examples, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further examples, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In examples, the first user can select the plurality of collaborative documents and the "Group Information" section to effectuate permissions to access (or view, edit, etc.) to the entire user group the "Group Information" section of each of the plurality of collaborative documents.

Automation in the Group-Based Communication System

Figure 3A:
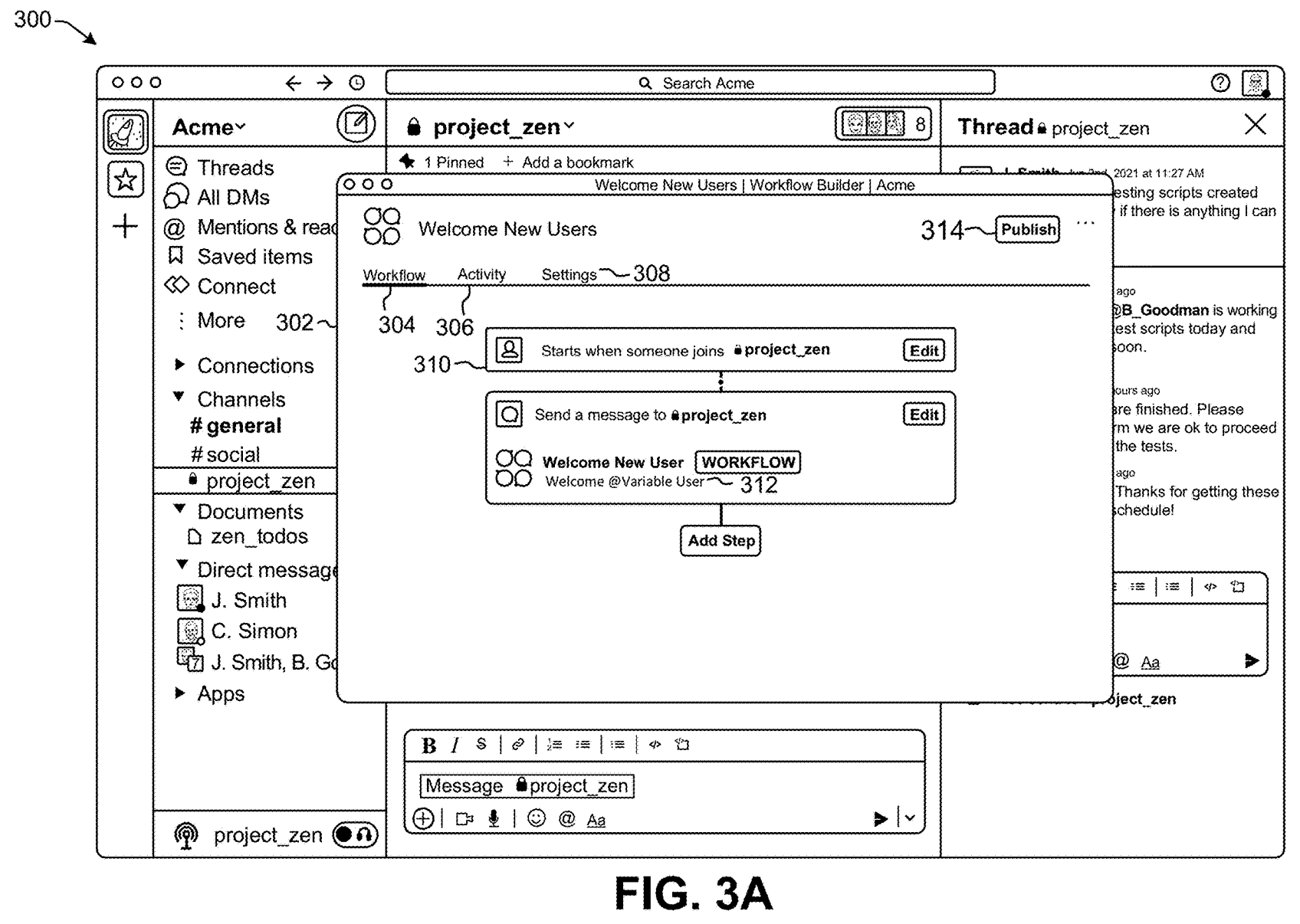

FIG. 3A illustrates user interface 300 for automation in the group-based communication system. Automation, also referred to as workflows, allow users to automate functionality within the group-based communication system. Workflow builder 302 is depicted which allows a user to create new workflows, modify existing workflows, and review the workflow activity. Workflow builder 302 may comprise a workflow tab 304, an activity tab 306, and/or a settings tab 308. In some examples, workflow builder may include a publish button 314 which permits a user to publish a new or modified workflow.

The workflow tab 304 may be selected to enable a user to create a new workflow or to modify an existing workflow. For example, a user may wish to create a workflow to automatically welcome new users who join a channel. A workflow may comprise workflow steps 310. Workflow steps 310 may comprise at least one trigger which initiates the workflow and at least one function which takes an action once the workflow is triggered. For example, a workflow may be triggered when a user joins a channel and a function of the workflow may be to post within the channel welcoming the new user. In some examples, workflows may be triggered from a user action, such as a user reacting to a message, joining a channel, or collaborating in a collaborative document, from a scheduled date and time, or from a web request from a third-party application or service. In further examples, workflow functionality may include sending messages or forms to users, channels, or any other virtual space, modifying collaborative documents, or interfacing with applications. Workflow functionality may include workflow variables 312. For example, a welcome message may include a user's name via a variable to allow for a customized message. Users may edit existing workflow steps or add new workflow steps depending on the desired workflow functionality. Once a workflow is complete, a user may publish the workflow using publish button 314. A published workflow will wait until it is triggered, at which point the functions will be executed.

Activity tab 306 may display information related to a workflow's activity. In some examples, the activity tab 306 may show how many times a workflow has been executed. In further examples, the activity tab 306 may include information related to each workflow execution including the status, last activity date, time of execution, user who initiated the workflow, and other relevant information. The activity tab 306 may permit a user to sort and filter the workflow activity to find useful information.

A settings tab 308 may permit a user to modify the settings of a workflow. In some examples, a user may change a title or an icon associated with the workflow. Users may also manage the collaborators associated with a workflow. For example, a user may add additional users to a workflow as collaborators such that the additional users can modify the workflow. In some examples, settings tab 308 may also permit a user to delete a workflow.

Figure 3B:
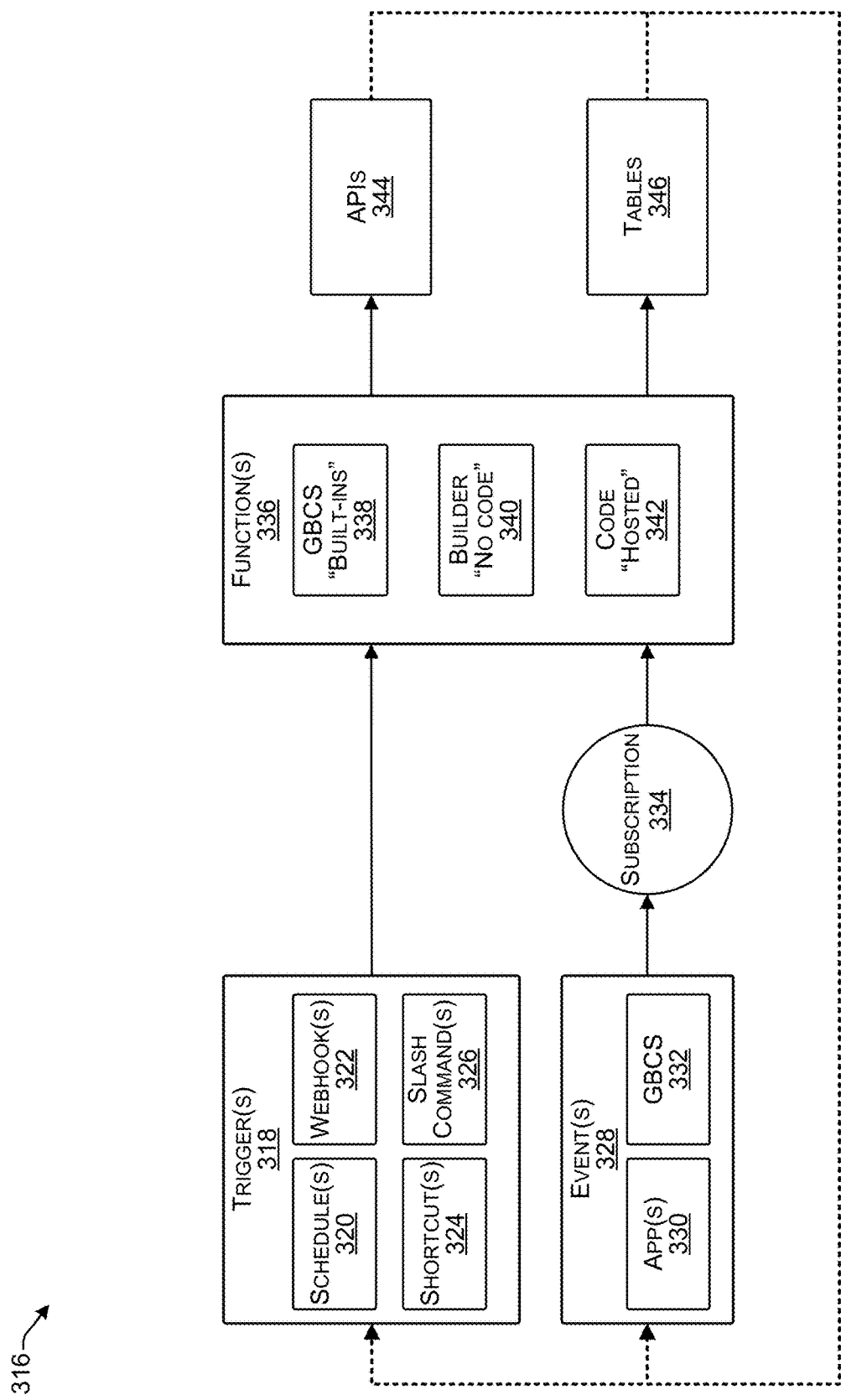
FIG. 3B depicts a block diagram for carrying out certain examples, as discussed herein.

FIG. 3B depicts elements related to workflows in the group-based communication system and is referred to generally by reference numeral 316. In various examples, trigger(s) 318 can be configured to invoke execution of function(s) 336 responsive to user instructions. A trigger initiates function execution and may take the form of one or more schedule(s) 320, webhook(s) 322, shortcut(s) 324, and/or slash command(s) 326. In some examples, the schedule 320 operates like a timer so that a trigger may be scheduled to fire periodically or once at a predetermined point in the future. In some examples, an end user of an event-based application sets an arbitrary schedule for the firing of a trigger, such as once-an-hour or every day at 9:15 AM.

Additionally, triggers 318 may take the form of the webhook 322. The webhook 322 may be a software component that listens at a webhook URL and port. In some examples, a trigger fires when an appropriate HTTP request is received at the webhook URL and port. In some examples, the webhook 322 requires proper authentication such as by way of a bearer token. In other examples, triggering will be dependent on payload content.

Another source of one of the trigger(s) 318 is a shortcut in the shortcut(s) 324. In some examples, the shortcut(s) 324 may be global to a group-based communication system and are not specific to a group-based communication system channel or workspace. Global shortcuts may trigger functions that are able to execute without the context of a particular group-based communication system message or group-based communication channel. By contrast, message- or channel-based shortcuts are specific to a group-based communication system message or channel and operate in the context of the group-based communication system message or group-based communication channel.

A further source of one of triggers 318 may be provided by way of slash commands 326. In some examples, the slash command(s) 326 may serve as entry points for group-based communication system functions, integrations with external services, or group-based communication system message responses. In some examples, the slash commands 326 may be entered by a user of a group-based communication system to trigger execution of application functionality. Slash commands may be followed by slash-command-line parameters that may be passed along to any group-based communication system function that is invoked in connection with the triggering of a group-based communication system function such as one of functions 336.

An additional way in which a function is invoked is when an event (such as one of events 328) matches one or more conditions as predetermined in a subscription (such as subscription 334). Events 328 may be subscribed to by any number of subscriptions 334, and each subscription may specify different conditions and trigger a different function. In some examples, events are implemented as group-based communication system messages that are received in one or more group-based communication system channels. For example, all events may be posted as non-user visible messages in an associated channel, which is monitored by subscriptions 334. App events 330 may be group-based communication system messages with associated metadata that are created by an application in a group-based communication system channel. Events 328 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may be able to post messages and upload files as well as be invited or removed from both public and private channels in a group-based communication system.

Events 328 may also be any event associated with a group-based communication system. Such group-based communication system events 332 include events relating to the creation, modification, or deletion of a user account in a group-based communication system or events relating to messages in a group-based communication system channel, such as creating a message, editing or deleting a message, or reacting to a message. Events 328 may also relate to creation, modification, or deletion of a group-based communication system channel or the membership of a channel. Events 328 may also relate to user profile modification or group creation, member maintenance, or group deletion.

As described above, subscription 334 indicates one or more conditions that, when matched by events, trigger a function. In some examples, a set of event subscriptions is maintained in connection with a group-based communication system such that when an event occurs, information regarding the event is matched against a set of subscriptions to determine which (if any) of functions 336 should be invoked. In some examples, the events to which a particular application may subscribe are governed by an authorization framework. In some instances, the event types matched against subscriptions are governed by OAuth permission scopes that may be maintained by an administrator of a particular group-based communication system.

In some examples, functions 336 can be triggered by triggers 318 and events 328 to which the function is subscribed. Functions 336 take zero or more inputs, perform processing (potentially including accessing external resources), and return zero or more results. Functions 336 may be implemented in various forms. First, there are group-based communication system built-ins 338, which are associated with the core functionality of a particular group-based communication system. Some examples include creating a group-based communication system user or channel. Second are no-code builder functions 340 that may be developed by a user of a group-based communication system user in connection with an automation user interface such as workflow builder user interface. Third, there are hosted-code functions 342 that are implemented by way of group-based communication system applications developed as software code in connection with a software development environment.

These various types of functions 336 may in turn integrate with APIs 344. In some examples, APIs 344 are associated with third-party services that functions 336 employ to provide a custom integration between a particular third-party service and a group-based communication system. Examples of third-party service integrations include video conferencing, sales, marketing, customer service, project management, and engineering application integration. In such an example, one of the triggers 318 would be a slash command 326 that is used to trigger a hosted-code function 342, which makes an API call to a third-party video conferencing provider by way of one of the APIs 344. As shown in FIG. 3B, the APIs 344 may themselves also become a source of any number of triggers 318 or events 328. Continuing the above example, successful completion of a video conference would trigger one of the functions 336 that sends a message initiating a further API call to the third-party video conference provider to download and archive a recording of the video conference and store it in a group-based communication system channel.

In addition to integrating with APIs 344, functions 336 may persist and access data in tables 346. In some examples, tables 346 are implemented in connection with a database environment associated with a serverless execution environment in which a particular event-based application is executing. In some instances, tables 346 may be provided in connection with a relational database environment. In other examples, tables 346 are provided in connection with a database mechanism that does not employ relational database techniques. As shown in FIG. 3B, in some examples, reading or writing certain data to one or more of tables 346, or data in table matching predefined conditions, is itself a source of some number of triggers 318 or events 328. For example, if tables 346 are used to maintain ticketing data in an incident-management system, then a count of open tickets exceeding a predetermined threshold may trigger a message being posted in an incident-management channel in the group-based communication system.

Figure 4:
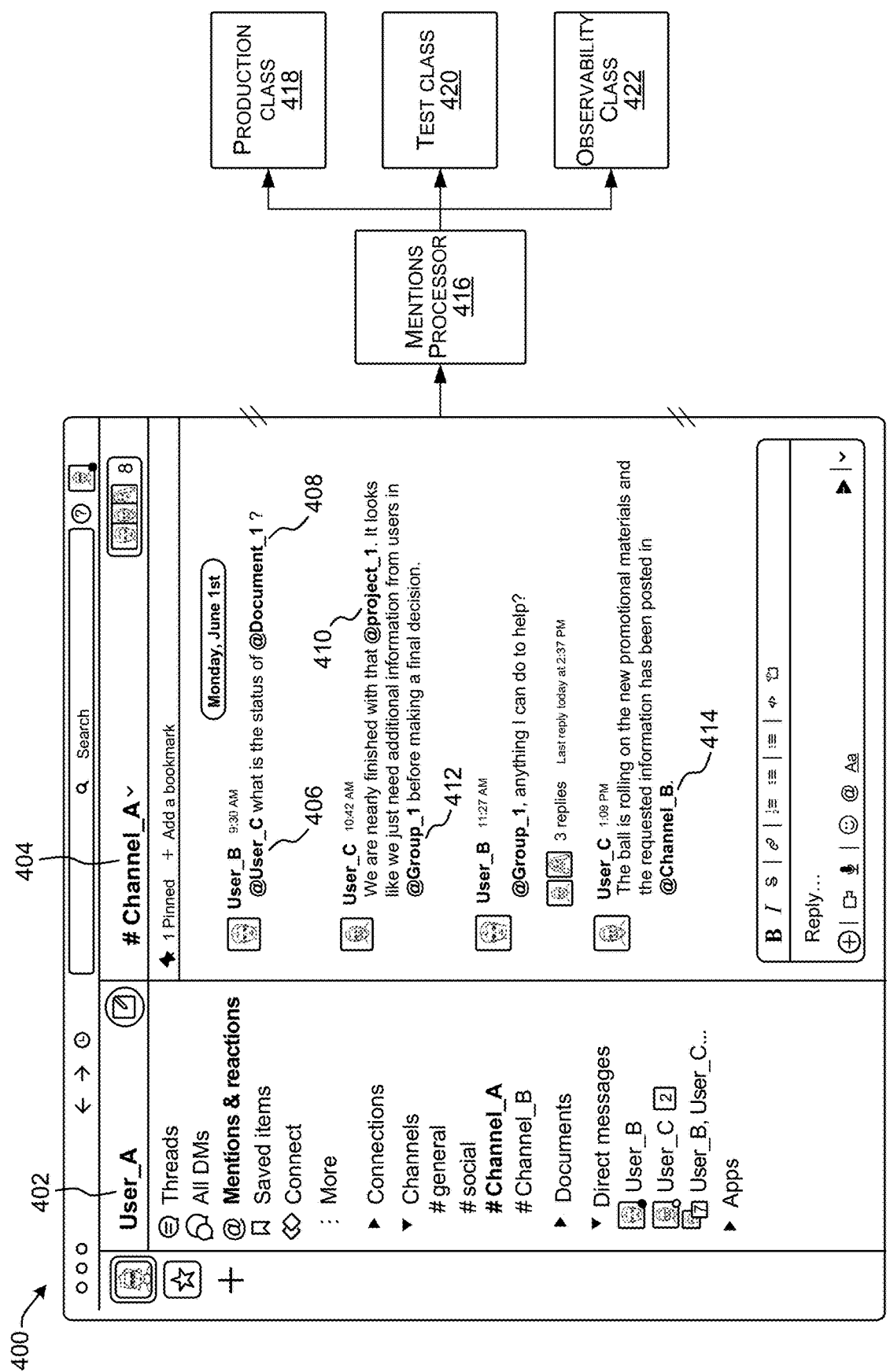
FIG. 4 illustrates an example user interface presenting different types of mention identifiers within a message associated with a communication platform, as described herein.

FIG. 4 illustrates an example user interface 400 presenting different types of mention identifiers within a message associated with a communication platform, as described herein. The example user interface 400 may present information associated with a user account 402 (e.g., User_A) and a virtual space 404 (e.g., Channel_A). In the particular example, the user interface 400 includes various types of mention identifiers embedded within messages posted in the virtual space 404. For example, a message may include one or more of a user account mention identifier 406 (or user profile mention identifier) (e.g., @User_C), a document mention identifier 408 (e.g., @Document_1), a keyword mention identifier 410 (e.g., @project_1), a group mention identifier 412 (e.g., @Group_1), a channel mention identifier 414 (e.g., @Channel_B), etc.

The mentions processor 416 may be configured to analyze a message to determine a type of mention identifier included in the message. For instance, a user of the communication platform may post or publish a message within a virtual space of the communication platform (e.g., a channel, a direct message, a workspace, etc.). After the message has been posted/published, the mentions processor 416 may parse the text of the message (e.g., characters, words, phrases, etc.) to determine if the user referenced a different user or a virtual space (e.g., @user, @channel, @directmessage, @workspace, etc.). Upon determining that the message includes a particular mention identifier, the mentions processor 416 may determine whether the user or virtual space (e.g., virtual space 404) referenced in the mention identifier is to be notified (e.g., a notification sent to the user and/or the virtual space). Whether the user and/or the virtual space is to receive a notification is based on previously determined notification preferences/settings for the user and/or the virtual space.

The mentions processor 416 (or mentions_log processor) encapsulates all side effects that may be triggered when a message is processed. A function (or operation or expression) produces a side effect if the function modifies some state other than its return value. For example, side effect(s) that may be triggered when processing a message may include sending a notification to a user, a group of users, a virtual space (e.g., a channel, a feed, a huddle, etc.) and the like. In some examples, a side effect may include sending an error message to a user account and/or virtual space upon detecting an error. In some examples, a side effect may include sending an email notification, a text message notification, sending a desktop notification, sending information associated with the message to one or more databases, generating a thread subscription, triggering one or more jobs associated the message, triggering a workflow, marking a message as unread, updating a mention identifier in a message, generating a pop-up notification, sending a delayed notification, overriding a "do not disturb" or snooze setting associated with a user account or virtual space, etc.

Determining whether to trigger a side effect (e.g., providing a notification to a user and/or a virtual space) may be based on one or more factors, including notification preference settings of the user and/or virtual space, including types of notification to be sent (e.g., email, text message, an indicator associated with the virtual space, etc.), the time in which notifications are to be provided, the frequency of notifications, and so on. Other factors may include whether a user is actively signed in to the communication platform, or whether the user is using the communication platform on their mobile device versus on a desktop computer. If the user is actively using the communication platform, a notification may be provided, but not if the user is logged out or is not accessing the communication platform. Moreover, if the user is actively accessing the communication platform, the notification may be shown as an indicator associated with the virtual space, but an email or text message notification may be sent if the user is not currently accessing the communication platform (e.g., logged out, set to an away status, in a meeting, etc.). An additional factor may include how the user is currently accessing the communication platform. For instance, whether or not the notification is to be sent, the type of the notification, the timing of the notification, etc. may be based on whether the user is accessing the communication platform via a web-based application, a desktop application, via a website, or via a mobile application residing on a mobile device of the user (e.g., a mobile telephone, tablet device, etc.).

The mentions processor 416 enables different side effects to be applied without having to modify business logic associated with the communication platform. The mentions processor 416 is configured such that not all side effects are triggered when a message is processed. The mentions processor 416 encapsulates all side effects within the mentions processor in order to allow for different applications of the side effects without implementing the overall business logic each time. Business logic (or domain logic) may include custom rules or algorithms that handle the exchange of information (or data) between a database and a user interface associated with the communication platform. In some examples, the communication platform includes a plurality of mentions processors configured to process the side effects differently. For example, a first mentions processor (e.g., a production mentions processor) may cause data associated with an observed mention identifier to be stored in a row (e.g., a horizontal set of data or components in a record) of one or more databases (i.e., the side effect would be to store the data in one or more databases). In some examples, a second mentions processor (e.g., a test mentions processor) may cause data associated with the mention identifier to be validated in a test or simulation (i.e., return a row to be validated in the test). In some examples, a third mentions processor (e.g., a record only mentions processor) may log that a row should have been stored in one or more databases. In some examples, the business logic used to generate the rows remains the same. In some examples, the mentions processor may be organized to include one or more of the following functions and/or structure:

```
Mention_log(MentionProcessor $processor): void {
    Mentions_log_reg($channel, $message, $processor):
        void
        // detect
        // filter
        // $processor→persist+send notifications
    Mentions_log_group($channel, $message, $processor): void
        // detect
        // filter
        // $processor→persist+send notifications
    Mentions_log_im($channel, $message, $processor):
        void
        // detect
        // filter
        // $processor→persist+send notifications
}
```

As an example, and not by way of limitation, the "$processor→persist+send notifications" may include the following side effects:

abstract class MentionProcessor
  function mentions storage store bulk($team, $channel, $message, $user_ids, 'mpdm');
  function mentions_push_check_immediate_single ($team, $user_ids, $message, 'mpdm').

The mentions processor 416 is a root node of a decision tree. The mentions processor 416 may include a production class 418, a test class 420, and an observability class 422. In some examples, the production class 418, the test class 420, and the observability class 422 may be subclasses of the mention processor 416. Each of the production class 418, the test class 420, and the observability class 422 may have its own implementation of how to process side effects. For example, the production class 418 may process side effects in the same manner that the mentions processor 416 would, while the test class 420 may be configured to process messages in a test environment (e.g., in an environment that may be unsafe for production, but useful for finding and correcting existing and potential errors). In some examples, the observability class 422 may process mention identifiers within a message similar to the production class 418 except that the observability class 422 records the side effects in a database and does not execute the side effects. The observability class 422 enables users of the communication platform to observe what occurred in production without triggering any side effects. In some examples, the production class 418 and the test class 420 may be represented within the mentions processor as follows:

ProdMentionProcessor extends MentionProcessor
DryRunMentionProcessor extends MentionProcessor In some examples, the production class 418 may be configured to send notifications to a user account and/or virtual space. In some examples, the production class 418 may be configured to process information that persists to a database. In some examples, the production class 418 includes, or is otherwise associated with, a container or other type of structure that includes logic and/or computer code for parsing messages posted/published within the communication platform, where such logic/computer code is able to detect any mention identifiers included within those messages. Instead of having a first set of functions that parse messages to identify mention identifiers referencing users and a different, second set of functions that parse messages to identify mention identifiers referencing virtual spaces (e.g., channels, direct messages, etc.), the logic/computer code associated with the production class 418 is configured to identify mention identifiers referencing users and/or virtual spaces of the communication platform.

The test class 420 may be used to process a simulation or test the manner in which the mentions processor 416 detects a mention identifier in a message. In some examples, running an instance of the test class 420 does not trigger one or more side-effects (e.g., sending a notification). Moreover, the test class 420 may include logic and/or computer code that is configured to parse messages posted/published via a virtual space (e.g., virtual space 404) of the communication platform that have previously been parsed in association with the production class 418. That is, in addition to the production class 418 parsing the messages to detect mention identifiers included within the messages, the test class 420 may also be used to subsequently parse such messages to also identify mention identifiers. As a result, the test class 420 may determine whether the production class 418 was able to correctly and accurately detect mention identifiers within messages posted/published within the communication platform. In other embodiments, the production class 418 and the test class 420 may simultaneously parse messages posted/published within the communication platform in order to detect whether the messages include message identifiers. That way, the mentions processor 416 may utilize different logic/computer code in order to determine whether both the production class 418 and the test class 420 of the mentions processor 416 are correctly and accurately identifying message identifiers included within messages posted/published within the communication platform. If so, the mentions processor 416 may determine that mention identifiers are correctly/accurately identified within these messages. However, the logic/computer code of the production class 418 and/or the test class 420 may be analyzed and potentially modified if some, but not all, mention identifiers are correctly being identified. Modifications may also be made if the mention identifiers are being correctly identified, but the user/virtual space referenced in the mention identifier is not being correctly identified.

In some examples, the observability class 422 may be used in association with a mentions lookup tool. In some examples, the observability class 422 may process messages in the same manner as the production class 418 except that the observability class 422 may store all side effects that may be triggered by a message as opposed to triggering the side effects. For example, the observability class 422 may parse messages and store any identified mention identifiers in a database rather than sending a notification to a user and/or virtual space. The observability class 422 may then be used to present the identified mention identifiers to a user via a graphical user interface (GUI) associated with the communication platform without triggering one or more side effects (e.g., sending a notification to a user and/or virtual space). For example, a user may wish to view what mention identifiers were or would be detected in a particular message. A mentions lookup tool associated with an observability class 422 allows a user to view the effects of running the mention processor for a permalink associated with a message. In some examples, detected mention identifiers may be stored in association with the message in one or more databases. In some cases, the communication platform may fail to send a message to a user account or virtual space due to an error (e.g., an error may occur during the processing of a mention identifier detected in a message). A user may wish to know what caused the error or how a mention identifier was processed in a message or whether or not a mention identifier was detected in a message. For example, upon searching for a detected mention identifier in a message using data associated with the message (e.g., data may include a permalink associated with the message, a primary key, channel ID, timestamp, etc.), a mentions lookup tool may present a user with a list of one or more identified mention identifiers in the message as well as what notifications, if any, were sent in association with the message. Additional details of operations that can be performed using the mentions lookup tool are described below in relation to FIGS. 6A and 6B.

Figure 5:
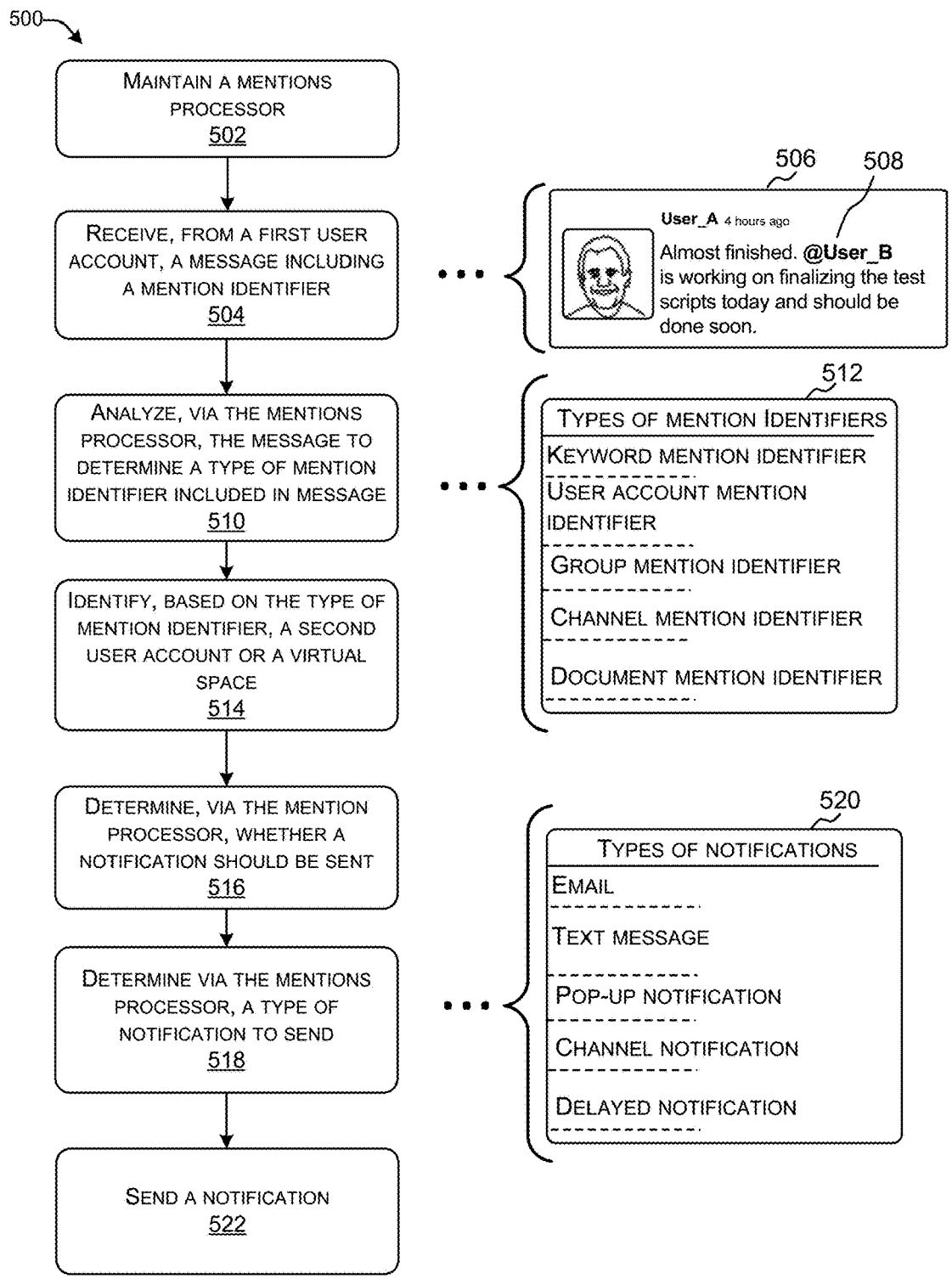
FIG. 5 illustrates a pictorial flow diagram illustrating an example process for receiving a message including a mention identifier, analyzing the message using a mentions processor, and sending a notification.

FIG. 5 illustrates a pictorial flow diagram illustrating an example process for receiving a message including a mention identifier, analyzing the message using a mentions processor, and sending a notification via the communication platform.

At operation 502, the communication platform maintains a mentions processor that is configured to identify one or more mention identifiers in a message transmitted via the communication platform. In some examples, the mentions processor is maintained within a messaging component. The mentions processor may include a production class configured to trigger one or more side effects and a test class that does not trigger notifications.

At operation 504, the process may include receiving, via the communication platform and from a first client associated with a first user profile (or a first user account), a message including a mention identifier. The message may be posted within a virtual space (e.g., a channel), added to a document associated with the communication platform (e.g., a comment in a document), or a message to another user account associated with the communication platform, etc. For example, as shown in FIG. 5, User_A posted a message 506 including a mention identifier 508. In the particular example, the mention identifier is a user account mention identifier and @mentions User_B. In some examples, the message may include a plurality of mention identifiers. For example, the message may include a first mention identifier and a second mention identifier. In some examples, the first mention identifier and the second mention identifier may be the same or different mention identifiers (e.g., the first mention identifier may be a user account mention identifier and the second mention identifier may be a channel mention identifier).

At operation 510, the process includes analyzing, via the mentions processor, the message to determine a type of the mention identifier included in the message 506. For example, a type of mention identifier may include one of a keyword mention identifier, a user profile mention identifier, a group mention identifier, a channel mention identifier, a document mention identifier, a virtual space mention identifier, a canvas mention identifier, and the like. In some examples, the user profile mention identifier can include a username, real name, or other unique identifier that is associated with a particular user or user account. In some examples, the group mention identifier includes a group of users or user accounts associated with the communication platform.

In some examples, the communication platform may generate log data associated with the mention identifier in the message in a record only mentions processor. The record only mentions processor may be associated with a database that stores the log data. Log data may represent a historical record of all of the information processed by the mentions processors (e.g., metadata associated with each message transmitted via the virtual space, such as a timestamp associated with the message, a sending user identifier, a recipient user identifier, a conversation identifier and/or a root object identifier, error(s) during processing, etc.). The record only mentions processor may enable a user to review one or more observed mention identifiers within a message.

For example, the record only mentions processor may be associated with a search tool (e.g., a mentions lookup tool) that enables a user to view how the mentions processor parsed a message and what side effects may have been triggered (if any). That is, instead of a user having to parse/view code associated with a message that includes a message identifier, the mentions processor allows any user to identify mentions included within the message. In some examples, the mentions look up tool may be used to determine whether one or more notifications were sent to another user account or virtual space associated with the communication platform. For example, an error may occur during the processing of a message including a mention identifier. In some examples, the error may be that a user account or virtual space did not receive a notification, received an incorrect type of notification (e.g., received a text message versus an email), received a notification at an inappropriate time (e.g., when a user had notifications snoozed), etc. In order to determine what error(s) occurred during the processing of the message, the user may utilize the mentions lookup tool to view (1) what mention identifiers were detected in the particular message, if any, and (2) what notifications were sent to which user accounts and/or virtual spaces, if any.

At operation 514, the process includes identifying, based at least in part on the type of mention identifier, a second user account or a virtual space of the communication platform referenced by the mention identifier. A virtual space may include a communication channel, a canvas, a collaborative document, etc. In some examples, a virtual space may be associated with a group of users. In some examples, the mentions processor may identify, based at least in part on the mention identifier being a keyword mention identifier, one or more user accounts or a virtual space to be notified when a particular keyword mention identifier is detected in a message (e.g., a virtual space may receive a notification when a keyword is @mentioned). In some examples, one or more user accounts or virtual space(s) may be notified based on a particular document mention identifier detected in a message (e.g., when a document is tagged via "@" one or more editors of the document may be notified). In some examples, the process may include identifying, via the mentions processor and based at least in part on the type of mention identifier, a third user account (or third user profile) or a second virtual space associated with the with mention identifier. For example, the message may include multiple user account mention identifiers and/or multiple channel mention identifiers.

At operation 516, the process may include determining, via the mention processor whether a notification should be sent, via the communication platform, to the second user account or the virtual space. In some examples, determining whether a notification should be sent is based at least in part on whether a message is processed through the production class or the test class associated with the message processor. For example, a message processed through the test class may not trigger a side effect, such as a notification. In some examples, upon determining that the notification should not be sent, the messaging component refrains from sending a notification associated with the message and instead displays, via the first client, the possible notifications associated with the message. In some examples, upon determining that the notification should not be sent, the mentions processor may generate log data associated with the mention identifier identified in the message and stores the log data in one or more databases.

In some examples, determining whether a notification should be sent is based at least in part on a notification preference or status associated with the second user account or the virtual space. For example, the second user account or the virtual space may be associated with a "do not disturb" status or a snooze status, paused notifications for a period of time, a preference to receive text or e-mail notifications, etc. In some examples, a user account or virtual space may prefer to receive notification only during working hours (e.g., Monday through Friday, 8 am to 5 pm).

In some examples, individual user accounts and/or individual virtual spaces may be associated with a separate mentions processor. In some examples, determining the type of notification to send to a second user account or a virtual space is based at least in part on the mentions processor being associated with the second user account or the virtual space. This would allow for more flexibility in choosing what side-effect(s) are triggered for specific user accounts or virtual spaces.

At operation 518, upon determining that a notification should be sent, the process may include determining a type of notification to send. A type of notification may include an email, a text message, a pop-up notification, a channel notification, a delayed notification, etc. Determining the type of notification to send is based at least in part on a notification preference associated with the second user account or the virtual space. For example, a user account may prefer to receive a first type of notification (e.g., a text message) from a first user account and a second type of notification from a second user account (e.g., an email), a user account may prefer to receive notifications for certain types of events (e.g., messages received via a channel, but not for other types of events (e.g., edits to a document), or a user account may prefer to receive notifications associated with certain user accounts, but not other user accounts. In some examples, the notification preference associated with the second user account may be different than the notification preference associated with the virtual space.

At operation 520, the process may include sending, based at least in part on the type of notification and to the second user account or the virtual space, a notification associated with the message.

Figure 6A:
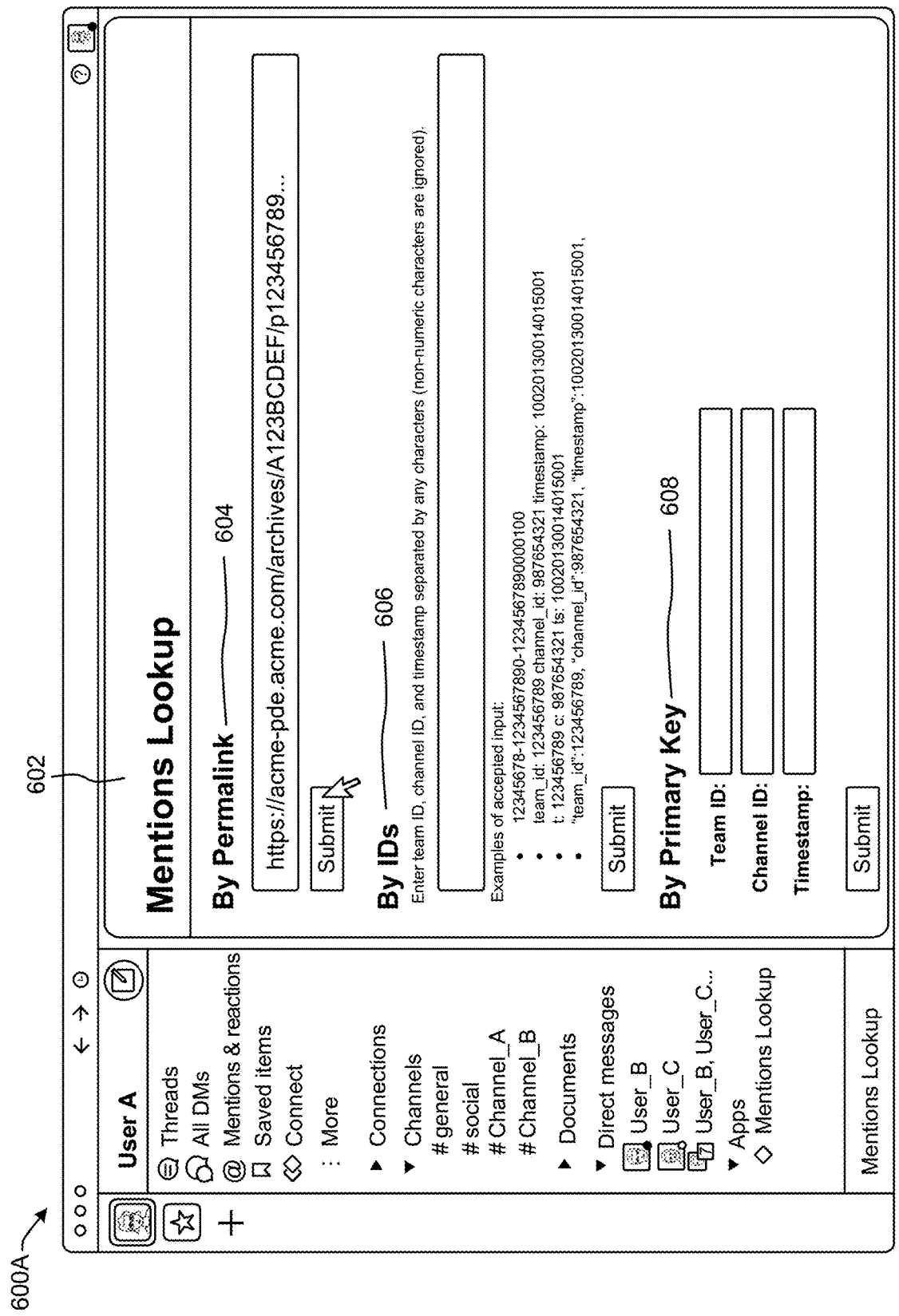
FIG. 6A illustrates a user interface that enables a user to search for one or more mention identifiers detected in a message.

FIG. 6A-6B illustrates example user interfaces that enable a user to search for and view one or more mention identifiers detected in a message.

For example, FIG. 6A depicts a user interface 600A that enables a user to search for mention identifiers that were detected within a message using data associated with a message. The communication platform may maintain a mentions lookup tool 602 that is associated with the mentions processor. In some examples, an observability class of the mentions processor is used to run the mentions lookup tool 602. In some examples, the mentions lookup tool 602 may be associated with a record only mentions processor. In some examples, the mentions lookup tool 602 may be used to determine which mentions were or would be detected in a message. In some examples, the mentions lookup tool 602 may access a database associated with the mentions processor. In some examples, the mentions lookup tool 602 may access stored log data associated with the mention identifier(s) identified in a message. The mentions lookup tool 602 enables a user to search for detected mentions in a message using stored data associated with the message. Data associated with the message may include a permalink 604, individual designations 606 (IDs) (e.g., team ID, channel ID, and timestamp separated by a character), or a primary key 608 associated with the message. A permalink 604 (or permanent link) is a unique address (e.g., a Uniform Resource Locator (URL)) that references a specific post, message, website, etc. A primary key 608 is a field or set of fields of a table that are used to identify all the data that is uniquely present in the table. The values of the primary key 608 may be used to refer to a data record.

In some examples, a computing device associated with the communication platform generates log data associated with the mention identifier(s) identified or detected in a message in a record mentions processor. The computing device may then store the log data in one or more databases associated with the communication platform. The computing device associated with the communication platform may then receive, via a search tool (e.g., the mentions lookup tool), an input of first data associated with the message, the first data input including one or a permalink, a message identification code, a team identification code, a channel identification code, or a timestamp associated with the message. The computing device associated with the communication platform may then identify, via the record mentions processor and using the log data, one or more observed mention identifiers within the message. The computing device associated with the communication platform may then present, via a user interface, one or more observed mention identifiers.

FIG. 6B illustrates an example user interface 600B that enables a user to view mention identifiers detected in a message. In the particular example, the mentions lookup tool 602 was used to view the effects of running the mention processor for a permalink associated with a message. In some examples, detected mention identifiers may be stored in association with the message. In some cases, the communication platform may fail to send a message to a user account or virtual space due to an error (e.g., an error may occur during the processing of a mention identifier detected in a message). A user may wish to know what caused the error or how a mention identifier was processed in a message or whether or not a mention identifier was detected in a message. For example, upon searching for a detected mention identifier in a message using data associated with the message (e.g., data may include a permalink associated with the message, a primary key, channel ID, timestamp, etc.), a mentions lookup tool 602 may present a graphical user interface (GUI) including data represented in a first portion and a second portion.

In examples, the first portion of the GUI may include data associated with one or more stored mention identifiers associated with a searched message. Stored mention identifiers may include mentions that were detected from the message. In some examples, the stored mention identifiers may be stored in a mentions table. The stored mention identifiers may be organized in a table by type 612 (i.e., the type of mention identifier observed within the message). For example, the type of mention identifiers may include user account mention identifiers (e.g., USER_ACCOUNT), group mention identifiers (e.g., USER_GROUP), word mention identifiers (e.g., WORD), channel mention identifiers (e.g., CHANNEL), etc. In some examples, the stored mention identifiers may be associated with one of a user ID 614 or a grouping ID 616. In some examples, the mention identifiers that are configured to send a notification to a user account may be associated with a User ID 614. For example, user account mention identifiers or word mention identifier may be associated with a User ID 614. In some examples, the mention identifiers that are configured to send a notification to a virtual space or multiple user accounts may be associated with a Grouping ID 616. For example, a keyword mention identifier, a group mention identifier, a channel mention identifier, or a document mention identifier may be associated with a Grouping ID 616.

In some examples, the second portion of the GUI may include data associated with one or more stored notifications 618 enqueued for the searched message. In some examples, enqueued notifications are notifications that are awaiting processing via the mentions processor. In some examples, enqueued notifications are notifications that would have been sent to a user and/or virtual space. The second portion may include information associated with each individual enqueued notification. The information may include a type of notification, a team ID, user ID, channel ID, timestamp, and/or do-not-disturb (DND) override associated with each individual enqueued notification. The type of notification may depend at least in part on a type of mention identifier detected in a message (e.g., a notification may be sent to a user account based on the mentions processor detecting a user account mention identifier, a notification may be sent to a user group based on the mentions processer detecting a user group mention identifier, a notifreation may be sent to a channel based on the mentions processor detecting a channel mention identifier, etc.). In some examples, the mentions processor may override a do-not-disturb notification preference associated with a user account or virtual space. For example, a user account may indicate that notifications associated with certain accounts or virtual spaces may override the do-not-disturb setting. In some examples, an administrator of the communication platform may override a do-not-disturb setting.

Example Clauses

A: A method, implemented at least in part by one or more computing devices of a communication platform, the method comprising: maintaining a mentions processor that is configured to identify mention identifiers in messages posted via the communication platform; receiving, via the communication platform and from a first client associated with a first user profile of the communication platform, a message; parsing, via the mentions processor, text of the message to identify a mention identifier included within the message; analyzing, via the mentions processor, the message to determine a type of the mention identifier; identifying, based at least in part on the type of mention identifier, a second user profile or a virtual space of the communication platform referenced by the mention identifier; determining, via the mentions processor, whether a notification is to be sent, via the communication platform, to the second user profile or the virtual space; upon determining that the notification is to be sent, determining, via the mentions processor, a type of notification to send; and sending, based at least in part on the type of notification and to the second user profile or the virtual space, a notification associated with the message.

B: The method of paragraph A, further comprising: determining that a second message including a second mention identifier has been posted via the communication platform; determining, based at least in part on a second type of the second mention identifier, whether a second notification associated with the second message is to be sent to a third user profile or a second virtual space referenced by the second mention identifier; and upon determining that the second notification is not to be sent: refraining from sending the second notification; generating log data associated with the second mention identifier identified in the second message; and storing the log data in one or more databases.

C: The method of either paragraph A or B, wherein determining the type of notification to send to the second user profile or the virtual space is based at least in part on the mentions processor being associated with the second user profile or the virtual space.

D: The method of any one of paragraphs A-C, wherein the type of mention identifier includes one of a keyword mention identifier, a user profile mention identifier, a group mention identifier, a channel mention identifier, or a document mention identifier.

E: The method of any one of paragraphs A-D, wherein the type of notification includes an email, a text message, a pop-up notification, a channel notification, or a delayed notification.

F: The method of any one of paragraphs A-E, further comprising: generating, via a record mentions processor, log data associated with the mention identifier identified in the message; storing the log data in one or more databases; receiving, via a search tool, an input of first data associated with the message, the first data input including one of a permalink, a message identification code, a team identification code, a channel identification code, or a timestamp associated with the message; identifying, via the record mentions processor and using the log data, one or more observed mention identifiers within the message; and presenting, via a user interface associated with the communication platform, a graphical user interface (GUI) comprising: a first portion including a representation of second data associated with one or more stored mention identifiers associated with the message; and a second portion including a representation of third data associated with one or more stored notifications enqueued for the message representing one or more notifications that were sent via the communication platform.

G: The method of paragraph F, wherein the second data associated with the one or more stored mention identifiers is organized based at least in part on a type of observed mention identifier within the message.

H: The method of any one of paragraphs A-G, further comprising: generating a production class derived from the mentions processor, the production class configured to be referenced in code executing in association with the communication platform; and generating a test class derived from the mentions processor, the test class configured to test data associated with the message.

I: The method of any one of paragraphs A-H, further comprising: identifying, via the mentions processor and based at least in part on the type of mention identifier, a third user profile or a second virtual space associated with the mention identifier; determining, via the mentions processor, the type of notification to send to the third user profile or the second virtual space based at least in part on a second notification preference setting associated with the third user profile or the second virtual space, wherein the second notification preference setting is different than a first notification preference associated with the second user profile or the virtual space; and sending, based at least in part on the type of notification and to the third user profile or the second virtual space, a second notification associated with the message.

J: The method of any one of paragraphs A-I, wherein determining whether the notification is to be sent to the second user profile or the virtual space is based at least in part on a notification preference setting associated with the second user profile or the virtual space, wherein the notification preference setting includes a preferred method of receiving the notification and a preferred time of receiving the notification.

K: A system comprising: one or more processors; and one or more non-transitory computer readable media storing instructions that, when executed, cause the system to perform operations comprising: maintaining a mentions processor that is configured to identify mention identifiers in messages posted via a communication platform; receiving, via the communication platform and from a first client associated with a first user profile of the communication platform, a message; parsing, via the mentions processor, text of the message to identify a mention identifier included within the message; analyzing, via the mentions processor, the message to determine a type of the mention identifier; identifying, based at least in part on the type of mention identifier, a second user profile or a virtual space of the communication platform referenced by the mention identifier; determining, via the mentions processor, whether a notification is to be sent, via the communication platform, to the second user profile or the virtual space; upon determining that the notification is to be sent, determining, via the mentions processor, a type of notification to send; and sending, based at least in part on the type of notification and to the second user profile or the virtual space, a notification associated with the message.

L: The system of paragraph K, further comprising: determining that a second message including a second mention identifier has been posted via the communication platform; determining, based at least in part on a second type of the second mention identifier, whether a second notification associated with the second message is to be sent to a third user profile or a second virtual space referenced by the second mention identifier; and upon determining that the second notification is not to be sent: refraining from sending the second notification; generating log data associated with the second mention identifier identified in the second message; and storing the log data in one or more databases.

M: The system of either paragraph K or L, wherein determining the type of notification to send to the second user profile or the virtual space is based at least in part on the mentions processor being associated with the second user profile or virtual space.

N: The system of any one of paragraphs K-M wherein the type of mention identifier includes one of a keyword mention identifier, a user profile mention identifier, a group mention identifier, a channel mention identifier, or a document mention identifier.

O: The system of any one of paragraphs K-N, wherein the type of notification includes an email, a text message, a pop-up notification, a channel notification, or a delayed notification.

P: The system of any one of paragraphs K-O, the operations further comprising: generating, via a record mentions processor, log data associated with the mention identifier identified in the message; storing the log data in one or more databases; receiving, via a search tool, an input of first data associated with the message, the first data input including one of a permalink, a message identification code, a team identification code, a channel identification code, or a timestamp associated with the message; identifying, via the record mentions processor and using the log data, one or more observed mention identifiers within the message; and presenting, via a user interface associated with the communication platform, a graphical user interface (GUI) comprising: a first portion including a representation of second data associated with one or more stored mention identifiers associated with the message; and a second portion including a representation of third data associated with one or more stored notifications enqueued for the message representing one or more notifications that were sent via the communication platform.

Q: One or more non-transitory computer-readable media storing instructions that, when executed by one or more processors, cause the one or more processors to perform operations comprising: maintaining a mentions processor that is configured to identify mention identifiers in messages posted via a communication platform; receiving, via the communication platform and from a first client associated with a first user profile of the communication platform, a message; parsing, via the mentions processor, text of the message to identify a mention identifier included within the message; analyzing, via the mentions processor, the message to determine a type of the mention identifier; identifying, based at least in part on the type of mention identifier, a second user profile or a virtual space of the communication platform referenced by the mention identifier; determining, via the mentions processor, whether a notification is to be sent, via the communication platform, to the second user profile or the virtual space; upon determining that the notification is to be sent, determining, via the mentions processor, a type of notification to send; and sending, based at least in part on the type of notification and to the second user profile or the virtual space, a notification associated with the message.

R: The one or more non-transitory computer-readable media of paragraph Q, the operations further comprising: generating a production class derived from the mentions processor, the production class configured to be referenced in code executing in association with the communication platform; and generating a test class derived from the mentions processor, the test class configured to test data associated with the message.

S: The one or more non-transitory computer-readable media of either paragraph Q or R, the operations further comprising: identifying, via the mentions processor and based at least in part on the type of mention identifier, a third user profile or a second virtual space associated with the mention identifier; determining, via the mentions processor, the type of notification to send to the third user profile or the second virtual space based at least in part on a second notification preference setting associated with the third user profile or the second virtual space, wherein the second notification preference setting is different than a first notification preference associated with the second user profile or the virtual space; and sending, based at least in part on the type of notification and to the third user profile or the second virtual space, a second notification associated with the message.

T: The one or more non-transitory computer-readable media of any one of paragraphs Q-S, wherein the notification preference includes a preferred method of receiving the notification and a preferred time of receiving the notification.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, the method comprising:
    maintaining a mentions processor that is configured to identify mention identifiers in messages posted via the communication platform;
    receiving, via the communication platform and from a first client associated with a first user profile of the communication platform, a message;
    parsing, via the mentions processor, text of the message to identify a mention identifier included within the message;
    analyzing, via the mentions processor, the message to determine a type of the mention identifier;
    identifying, based at least in part on the type of mention identifier, a second user profile or a virtual space of the communication platform referenced by the mention identifier;
    determining, via the mentions processor, whether a notification is to be sent, via the communication platform, to the second user profile or the virtual space;
    upon determining that the notification is to be sent, determining, via the mentions processor, a type of notification to send; and
    sending, based at least in part on the type of notification and to the second user profile or the virtual space, a notification associated with the message.

2. The method of claim 1, further comprising:
    determining that a second message including a second mention identifier has been posted via the communication platform;
    determining, based at least in part on a second type of the second mention identifier, whether a second notification associated with the second message is to be sent to a third user profile or a second virtual space referenced by the second mention identifier; and
    upon determining that the second notification is not to be sent:
        refraining from sending the second notification;
        generating log data associated with the second mention identifier identified in the second message; and
        storing the log data in one or more databases.

3. The method of claim 1, wherein determining the type of notification to send to the second user profile or the virtual space is based at least in part on the mentions processor being associated with the second user profile or the virtual space.

4. The method of claim 1, wherein the type of mention identifier includes one of a keyword mention identifier, a user profile mention identifier, a group mention identifier, a channel mention identifier, or a document mention identifier.

5. The method of claim 1, wherein the type of notification includes an email, a text message, a pop-up notification, a channel notification, or a delayed notification.

6. The method of claim 1, further comprising:
generating, via a record mentions processor, log data associated with the mention identifier identified in the message;
storing the log data in one or more databases;
receiving, via a search tool, an input of first data associated with the message, the first data input including one of a permalink, a message identification code, a team identification code, a channel identification code, or a timestamp associated with the message;
identifying, via the record mentions processor and using the log data, one or more observed mention identifiers within the message; and
presenting, via a user interface associated with the communication platform, a graphical user interface (GUI) comprising:
a first portion including a representation of second data associated with one or more stored mention identifiers associated with the message; and
a second portion including a representation of third data associated with one or more stored notifications enqueued for the message representing one or more notifications that were sent via the communication platform.

7. The method of claim 6, wherein the second data associated with the one or more stored mention identifiers is organized based at least in part on a type of observed mention identifier within the message.

8. The method of claim 1, further comprising:
generating a production class derived from the mentions processor, the production class configured to be referenced in code executing in association with the communication platform; and
generating a test class derived from the mentions processor, the test class configured to test data associated with the message.

9. The method of claim 1, further comprising:
identifying, via the mentions processor and based at least in part on the type of mention identifier, a third user profile or a second virtual space associated with the mention identifier;
determining, via the mentions processor, the type of notification to send to the third user profile or the second virtual space based at least in part on a second notification preference setting associated with the third user profile or the second virtual space, wherein the second notification preference setting is different than a first notification preference associated with the second user profile or the virtual space; and
sending, based at least in part on the type of notification and to the third user profile or the second virtual space, a second notification associated with the message.

10. The method of claim 1, wherein determining whether the notification is to be sent to the second user profile or the virtual space is based at least in part on a notification preference setting associated with the second user profile or the virtual space, wherein the notification preference setting includes a preferred method of receiving the notification and a preferred time of receiving the notification.

11. A system comprising:
one or more processors; and
one or more non-transitory computer readable media storing instructions that, when executed, cause the system to perform operations comprising:
maintaining a mentions processor that is configured to identify mention identifiers in messages posted via a communication platform;
receiving, via the communication platform and from a first client associated with a first user profile of the communication platform, a message;
parsing, via the mentions processor, text of the message to identify a mention identifier included within the message;
analyzing, via the mentions processor, the message to determine a type of the mention identifier;
identifying, based at least in part on the type of mention identifier, a second user profile or a virtual space of the communication platform referenced by the mention identifier;
determining, via the mentions processor, whether a notification is to be sent, via the communication platform, to the second user profile or the virtual space;
upon determining that the notification is to be sent, determining, via the mentions processor, a type of notification to send; and
sending, based at least in part on the type of notification and to the second user profile or the virtual space, a notification associated with the message.

12. The system of claim 11, further comprising:
determining that a second message including a second mention identifier has been posted via the communication platform;
determining, based at least in part on a second type of the second mention identifier, whether a second notification associated with the second message is to be sent to a third user profile or a second virtual space referenced by the second mention identifier; and
upon determining that the second notification is not to be sent:
refraining from sending the second notification;
generating log data associated with the second mention identifier identified in the second message; and
storing the log data in one or more databases.

13. The system of claim 11, wherein determining the type of notification to send to the second user profile or the virtual space is based at least in part on the mentions processor being associated with the second user profile or virtual space.

14. The system of claim 11, wherein the type of mention identifier includes one of a keyword mention identifier, a user profile mention identifier, a group mention identifier, a channel mention identifier, or a document mention identifier.

15. The system of claim 11, wherein the type of notification includes an email, a text message, a pop-up notification, a channel notification, or a delayed notification.

16. The system of claim 11, the operations further comprising:
generating, via a record mentions processor, log data associated with the mention identifier identified in the message;
storing the log data in one or more databases;
receiving, via a search tool, an input of first data associated with the message, the first data input including one of a permalink, a message identification code, a team identification code, a channel identification code, or a timestamp associated with the message;

identifying, via the record mentions processor and using the log data, one or more observed mention identifiers within the message; and presenting, via a user interface associated with the communication platform, a graphical user interface (GUI) comprising:
- a first portion including a representation of second data associated with one or more stored mention identifiers associated with the message; and
- a second portion including a representation of third data associated with one or more stored notifications enqueued for the message representing one or more notifications that were sent via the communication platform.

17. One or more non-transitory computer-readable media storing instructions that, when executed by one or more processors, cause the one or more processors to perform operations comprising:

maintaining a mentions processor that is configured to identify mention identifiers in messages posted via a communication platform;

receiving, via the communication platform and from a first client associated with a first user profile of the communication platform, a message;

parsing, via the mentions processor, text of the message to identify a mention identifier included within the message;

analyzing, via the mentions processor, the message to determine a type of the mention identifier;

identifying, based at least in part on the type of mention identifier, a second user profile or a virtual space of the communication platform referenced by the mention identifier;

determining, via the mentions processor, whether a notification is to be sent, via the communication platform, to the second user profile or the virtual space;

upon determining that the notification is to be sent, determining, via the mentions processor, a type of notification to send; and sending, based at least in part on the type of notification and to the second user profile or the virtual space, a notification associated with the message.

18. The one or more non-transitory computer-readable media of claim 17, the operations further comprising:

generating a production class derived from the mentions processor, the production class configured to be referenced in code executing in association with the communication platform; and generating a test class derived from the mentions processor, the test class configured to test data associated with the message.

19. The one or more non-transitory computer-readable media of claim 17, the operations further comprising:

identifying, via the mentions processor and based at least in part on the type of mention identifier, a third user profile or a second virtual space associated with the mention identifier;

determining, via the mentions processor, the type of notification to send to the third user profile or the second virtual space based at least in part on a second notification preference setting associated with the third user profile or the second virtual space, wherein the second notification preference setting is different than a first notification preference associated with the second user profile or the virtual space; and sending, based at least in part on the type of notification and to the third user profile or the second virtual space, a second notification associated with the message.

20. The one or more non-transitory computer-readable media of claim 17, wherein determining the type of notification to send depends at least in part on a notification preference associated with the second user profile or the virtual space, the notification preference including a preferred method of receiving the notification and a preferred time of receiving the notification.

* * * * *